US012154522B2

(12) United States Patent
Lee et al.

(10) Patent No.: US 12,154,522 B2
(45) Date of Patent: Nov. 26, 2024

(54) IMAGE DISPLAY DEVICE

(71) Applicant: LG ELECTRONICS INC., Seoul (KR)

(72) Inventors: Jongmin Lee, Seoul (KR); Sunwoo Jung, Seoul (KR); Myongyoung Lee, Seoul (KR); Kyuyong Chung, Seoul (KR); Wonki Lee, Seoul (KR); Seokpan Kang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/254,784

(22) PCT Filed: Nov. 27, 2020

(86) PCT No.: PCT/KR2020/017149
§ 371 (c)(1),
(2) Date: May 26, 2023

(87) PCT Pub. No.: WO2022/114301
PCT Pub. Date: Jun. 2, 2022

(65) Prior Publication Data
US 2024/0038184 A1 Feb. 1, 2024

(51) Int. Cl.
*G09G 3/34* (2006.01)

(52) U.S. Cl.
CPC ... *G09G 3/3426* (2013.01); *G09G 2320/0252* (2013.01)

(58) Field of Classification Search
CPC ......... G09G 3/3426; G09G 2320/0252; G09G 2320/0633; G09G 3/342; G09G 2320/064;
(Continued)

(56) References Cited

U.S. PATENT DOCUMENTS

2013/0021386 A1* 1/2013 Min .......................... G09G 3/36 345/102
2015/0287386 A1* 10/2015 Kim ..................... G09G 3/3406 345/690

(Continued)

FOREIGN PATENT DOCUMENTS

KR 1020080066392 7/2008
KR 1020100070915 6/2010

(Continued)

OTHER PUBLICATIONS

PCT International Application No. PCT/KR2020/017149 International Search Report dated Aug. 24, 2021, 2 pages.

*Primary Examiner* — Amy Onyekaba
(74) *Attorney, Agent, or Firm* — LEE, HONG, DEGERMAN, KANG & WAIMEY

(57) ABSTRACT

The present disclosure relates to an image display apparatus. The image display apparatus according to an embodiment of the present disclosure includes a display panel; a plurality of light sources configured to output light to the display panel; a plurality of switching elements configured to switch the light sources, respectively; and a processor configured to output a switching control signal having variable amplitude to the switching element, wherein the processor controls a driving frequency of the light source to be a second frequency higher than a first frequency corresponding to a vertical synchronization signal of the panel. Thus, the sharpness of the image can be improved.

19 Claims, 21 Drawing Sheets

(58) Field of Classification Search
CPC ............. G09G 3/3696; G09G 2310/08; G09G 2340/0435
See application file for complete search history.

(56) References Cited

U.S. PATENT DOCUMENTS

| | | | | |
|---|---|---|---|---|
| 2017/0270873 | A1* | 9/2017 | An | G09G 3/3426 |
| 2018/0268781 | A1* | 9/2018 | Park | G09G 5/10 |
| 2019/0295479 | A1* | 9/2019 | An | G09G 3/3426 |
| 2021/0312876 | A1* | 10/2021 | Chen | G09G 3/3406 |

FOREIGN PATENT DOCUMENTS

| | | |
|---|---|---|
| KR | 1020150078354 | 7/2015 |
| KR | 1020160054278 | 5/2016 |
| KR | 1020200079794 | 7/2020 |

* cited by examiner

IMAGE DISPLAY DEVICE

CROSS-REFERENCE TO RELATED APPLICATION(S)

This application is the National Stage filing under 35 U.S.C. 371 of International Application No. PCT/KR2020/017149, filed on Nov. 27, 2020, the contents of which are all incorporated by reference herein in its entirety.

BACKGROUND OF THE DISCLOSURE

1. Field of the Disclosure

The present disclosure relates to an image display apparatus, and more particularly, to an image display apparatus capable of improving the sharpness of an image.

2. Description of the Related Art

An image display apparatus is an apparatus that displays an input image. In order to display an input image, an image display apparatus includes a signal processing device that performs signal processing for an input image and a display that displays an image based on image data signal-processed by the signal processing device.

Meanwhile, when a display includes a liquid crystal display panel, a separate backlight is required, and it is necessary to drive the backlight in consideration of a liquid crystal response speed of the liquid crystal display panel.

SUMMARY

The present disclosure has been made in view of the above problems, and provides an image display apparatus capable of improving the sharpness of an image.

Meanwhile, the present disclosure further provides an image display apparatus capable of improving the sharpness of an image, when driving a light source based on a switching control signal having variable amplitude.

Meanwhile, the present disclosure further provides an image display apparatus capable of reducing dual image display, when driving a light source based on a switching control signal having variable amplitude.

In accordance with an aspect of the present disclosure, there is provided an image display apparatus including: a display panel; a plurality of light sources configured to output light to the display panel; a plurality of switching elements configured to switch the light sources, respectively; and a processor configured to output a switching control signal having variable amplitude to the switching element, wherein the processor controls a driving frequency of the light source to be a second frequency higher than a first frequency corresponding to a vertical synchronization signal of the panel.

Meanwhile, in response to a driving frequency variable mode of the light source, the processor may drive the switching element based on the second frequency.

Meanwhile, the processor changes a level of the switching control signal applied to the switching element, for every period corresponding to the second frequency.

Meanwhile, the processor may change a level of the switching control signal applied to the switching element, for every second period corresponding to the second frequency during a first period corresponding to the first frequency.

Meanwhile, during a first period corresponding to the first frequency, the processor may be configured to sequentially increase or gradually decrease a level of the switching control signal applied to the switching element.

Meanwhile, during a first period corresponding to the first frequency, the processor may be configured to change a level of a current flowing through the light source.

Meanwhile, during a first period corresponding to the first frequency, the processor may be configured to sequentially increase or gradually decrease a level of a current flowing through the light source.

Meanwhile, in case in which a first area of the panel displays a white image during a first frame period, and the first area of the panel displays a black image during a second frame period after the first frame period, the processor may control a first light source corresponding to the first area to output a gradually increasing light during the first frame period, and controls the first light source corresponding to the first area to output a gradually decreasing light during the second frame period.

Meanwhile, in case in which the panel includes a liquid crystal panel, the processor may control the first light source corresponding to the first area to output a gradually increasing light or a gradually decreasing light, in response to a liquid crystal response speed pattern of the liquid crystal panel.

Meanwhile, in case in which the panel includes a liquid crystal panel, the processor may control a light change rate of the first light source corresponding to the first area to be less than a liquid crystal response speed change rate of the liquid crystal panel.

Meanwhile, the processor may control a gradual light change rate during the second frame period to be greater than a gradual light change rate during the first frame period.

Meanwhile, the processor changes the second frequency, based on a movement or average luminance level of image input to the panel.

Meanwhile, in response to a movement of a second image being greater than a movement of a first image input to the panel, the processor may control the driving frequency of the light source to be higher in case of displaying the second image than in case of displaying the first image.

Meanwhile, in response to an average luminance level of a second image being greater than an average luminance level of a first image input to the panel, the processor may control the driving frequency of the light source to be higher in case of displaying the second image than in case of displaying the first image.

Meanwhile, in response to a luminance of a second area being greater than a luminance of a first area among images input to the panel, the processor may control the driving frequency of the light source corresponding to the second area to be higher than the driving frequency of the light source corresponding to the first area.

In accordance with another aspect of the present disclosure, there is provided an image display apparatus including: a display panel; a plurality of light sources configured to output light to the display panel; a plurality of switching elements configured to switch the light sources, respectively; and a processor configured to output a switching control signal having variable amplitude to the switching element, wherein in response to the panel displaying a certain image during a frame period corresponding to a vertical synchronization signal of the panel, the processor is configured to gradually increase or decrease a light output from the light source.

Meanwhile, in case in which a first area of the panel displays a white image during a first frame period, and the first area of the panel displays a black image during a second frame period after the first frame period, the processor may control a first light source corresponding to the first area to output a gradually increasing light during the first frame period, and controls the first light source corresponding to the first area to output a gradually decreasing light during the second frame period.

Effects of the Disclosure

The image display apparatus according to an embodiment of the present disclosure includes: a display panel; a plurality of light sources configured to output light to the display panel; a plurality of switching elements configured to switch the light sources, respectively; and a processor configured to output a switching control signal having variable amplitude to the switching element, wherein the processor controls a driving frequency of the light source to be a second frequency higher than a first frequency corresponding to a vertical synchronization signal of the panel. Accordingly, the sharpness of an image can be improved. In particular, when a light source is driven based on a switching control signal with variable amplitude, the sharpness of an image can be improved.

Meanwhile, in response to a driving frequency variable mode of the light source, the processor may drive the switching element based on the second frequency. Accordingly, when a light source is driven based on a switching control signal with variable amplitude, the sharpness of an image can be improved.

Meanwhile, the processor may change a level of the switching control signal applied to the switching element, for every period corresponding to the second frequency. Accordingly, when a light source is driven based on a switching control signal with variable amplitude, the sharpness of an image can be improved.

Meanwhile, the processor may change a level of the switching control signal applied to the switching element, for every second period corresponding to the second frequency during a first period corresponding to the first frequency. Accordingly, when a light source is driven based on a switching control signal with variable amplitude, the sharpness of an image can be improved.

Meanwhile, during a first period corresponding to the first frequency, the processor may be configured to sequentially increase or gradually decrease a level of the switching control signal applied to the switching element. Accordingly, when a light source is driven based on a switching control signal with variable amplitude, the sharpness of an image can be improved.

Meanwhile, during a first period corresponding to the first frequency, the processor may be configured to change a level of a current flowing through the light source. Accordingly, when a light source is driven based on a switching control signal with variable amplitude, the sharpness of an image can be improved.

Meanwhile, during a first period corresponding to the first frequency, the processor may be configured to sequentially increase or gradually decrease a level of a current flowing through the light source. Accordingly, when a light source is driven based on a switching control signal with variable amplitude, the sharpness of an image can be improved.

Meanwhile, in case in which a first area of the panel displays a white image during a first frame period, and the first area of the panel displays a black image during a second frame period after the first frame period, the processor may control a first light source corresponding to the first area to output a gradually increasing light during the first frame period, and controls the first light source corresponding to the first area to output a gradually decreasing light during the second frame period. Accordingly, when a light source is driven based on a switching control signal with variable amplitude, the sharpness of an image can be improved.

Meanwhile, in case in which the panel includes a liquid crystal panel, the processor may control the first light source corresponding to the first area to output a gradually increasing light or a gradually decreasing light, in response to a liquid crystal response speed pattern of the liquid crystal panel. Accordingly, when a light source is driven based on a switching control signal with variable amplitude, dual image display can be reduced.

Meanwhile, in case in which the panel includes a liquid crystal panel, the processor may control a light change rate of the first light source corresponding to the first area to be less than a liquid crystal response speed change rate of the liquid crystal panel. Accordingly, when a light source is driven based on a switching control signal with variable amplitude, dual image display can be reduced.

Meanwhile, the processor may control a gradual light change rate during the second frame period to be greater than a gradual light change rate during the first frame period. Accordingly, when a light source is driven based on a switching control signal with variable amplitude, dual image display can be reduced.

Meanwhile, the processor may change the second frequency, based on a movement or average luminance level of image input to the panel. Accordingly, when a light source is driven based on a switching control signal with variable amplitude, the sharpness of an image can be improved.

Meanwhile, in response to a movement of a second image being greater than a movement of a first image input to the panel, the processor may control the driving frequency of the light source to be higher in case of displaying the second image than in case of displaying the first image. Accordingly, when a light source is driven based on a switching control signal with variable amplitude, the sharpness of an image can be improved.

Meanwhile, in response to an average luminance level of a second image being greater than an average luminance level of a first image input to the panel, the processor may control the driving frequency of the light source to be higher in case of displaying the second image than in case of displaying the first image. Accordingly, when a light source is driven based on a switching control signal with variable amplitude, the sharpness of an image can be improved.

Meanwhile, in response to a luminance of a second area being greater than a luminance of a first area among images input to the panel, the processor may control the driving frequency of the light source corresponding to the second area to be higher than the driving frequency of the light source corresponding to the first area. Accordingly, when a light source is driven based on a switching control signal with variable amplitude, the sharpness of an image can be improved.

In accordance with another aspect of the present disclosure, there is provided an image display apparatus including: a display panel; a plurality of light sources configured to output light to the display panel; a plurality of switching elements configured to switch the light sources, respectively; and a processor configured to output a switching control signal having variable amplitude to the switching element, wherein in response to the panel displaying a certain image during a frame period corresponding to a vertical synchronization signal of the panel, the processor is configured to gradually increase or decrease a light output from the light source. Accordingly, the sharpness of an image can be improved. In particular, when a light source is driven based on a switching control signal with variable amplitude, the sharpness of an image can be improved.

Meanwhile, in case in which a first area of the panel displays a white image during a first frame period, and the first area of the panel displays a black image during a second frame period after the first frame period, the processor may control a first light source corresponding to the first area to output a gradually increasing light during the first frame period, and controls the first light source corresponding to the first area to output a gradually decreasing light during the second frame period. Accordingly, when a light source is driven based on a switching control signal with variable amplitude, the sharpness of an image can be improved.

DETAILED DESCRIPTION OF THE PREFERRED EMBODIMENTS

Hereinafter, the present disclosure will be described in more detail with reference to the drawings.

Suffixes such as "module" and "unit" may be used to refer to elements or components. Use of such suffixes herein is merely intended to facilitate description of the specification, and the suffixes do not have any special meaning or function. Accordingly, the "module" and "unit" may be used interchangeably.

Figure 1:
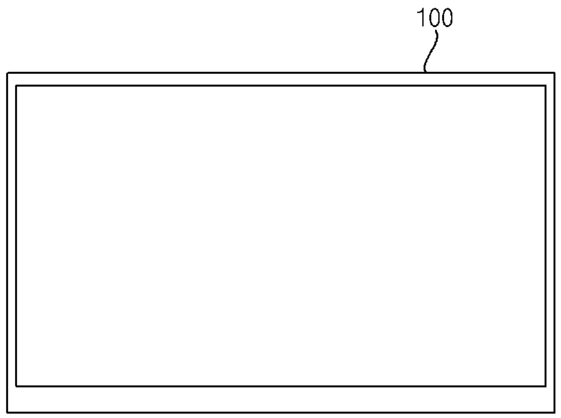
FIG. 1 is a diagram illustrating an image display apparatus according to an embodiment of the present disclosure.

FIG. 1 is a diagram illustrating an outer shape of an image display apparatus according to an embodiment of the present disclosure.

Figure 2:
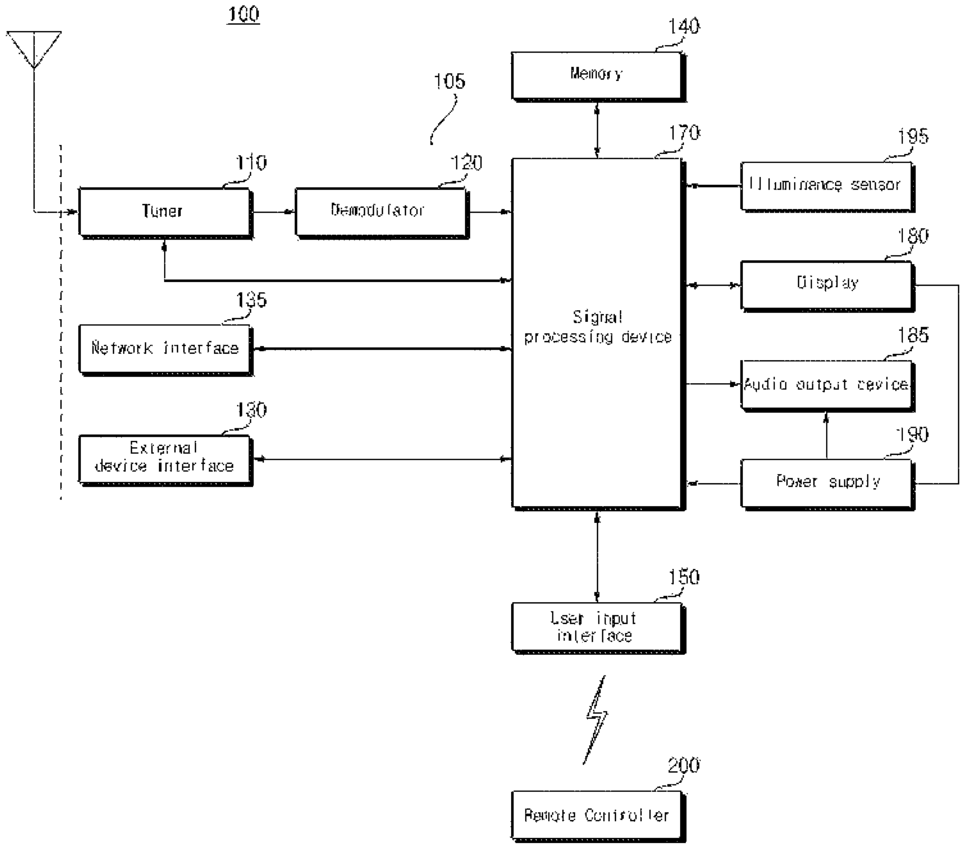
FIG. 2 is an example of an internal block diagram of the image display apparatus of FIG. 1.

Referring to FIG. 1, an image display apparatus 100 according to an embodiment of the present disclosure may include a display (180 in FIG. 2).

Meanwhile, the image display apparatus 100 according to an embodiment of the present disclosure may include a display panel 210, a plurality of light sources (LS1 to LS6 in FIG. 8) outputting light to the display panel (210 in FIG. 6), a plurality of switching elements (Sa1 to Sa6 in FIG. 8) for switching the light sources (LS1 to LS6 in FIG. 8), and a processor 1130 that outputs a switching control signal (SG1 to SG6 in FIG. 8) having variable amplitude to the switching elements (Sa1 to Sa6).

In the present disclosure, it is assumed that the processor 1130 outputs a pulse amplitude variable (PAM) based switching control signal, rather than a pulse width variable (PWM) based switching control signal.

Meanwhile, the sharpness of image display may be lowered when driving a plurality of light sources, based on a variable pulse width (PAM) based switching control signal, compared to the case of driving the light source based on a variable pulse width (PWM) based switching control signal.

Accordingly, the image display apparatus 100 according to an embodiment of the present disclosure includes a display panel 210, a plurality of light sources LS1 to LS6 outputting light to the display panel 210, a plurality of switching elements Sa1 to Sa6 for switching the light sources LS1 to LS6, and the processor 1130 outputting switching control signals SG1 to SG6 having variable amplitude to the switching elements Sa1 to Sa6. The processor 1130 controls the driving frequency of the light sources LS1 to LS6 to be a second frequency higher than the first frequency corresponding to a vertical synchronization signal Vsync of the panel 210. Accordingly, it is possible to improve the sharpness of the image. In particular, when the light source is driven based on the switching control signal (SG) having variable amplitude, it is possible to improve the sharpness of the image.

That is, the driving frequency of the light source is multiplied by a second frequency higher than the first frequency corresponding to the vertical synchronization signal Vsync, and the plurality of light sources (LS1 to LS6 in FIG. 8) are derived under the multiplied second frequency basis, thereby increasing the sharpness of display image. This will be described in more detail with reference to FIG. 11 below.

FIG. 2 is an internal block diagram of an image display apparatus according to an embodiment of the present disclosure.

Referring to FIG. 2, the image display apparatus 100 according to an embodiment of the present disclosure may include an image receiver 105, an external device interface 130, a memory 140, a user input interface 150, a sensor device (not shown), a signal processing device 170, a display 180, an audio output device 185, a power supply 190, and an illuminance sensor 195.

The image receiver 105 may include a tuner 110, a demodulator 120, a network interface 130, and an external device interface 130.

Meanwhile, unlike the drawing, the image receiver 105 may include only the tuner 110, the demodulator 120, and the external device interface 130. That is, the network interface 130 may not be included.

The tuner 110 selects a radio frequency (RF) broadcasting signal corresponding to a channel selected by a user or all pre-stored channels among radio frequency (RF) broadcasting signals received through an antenna (not shown). In addition, the selected RF broadcasting signal is converted into an intermediate frequency signal or a baseband image or voice signal.

Meanwhile, the tuner 110 may include a plurality of tuners in order to receive broadcast signals of a plurality of channels. Alternatively, a single tuner that simultaneously receives broadcast signals of a plurality of channels is also possible.

The demodulator 120 receives a digital IF signal (DIF) converted by the tuner 110 and performs a demodulation operation.

The demodulator 120 may output a stream signal TS after performing demodulation and channel decoding. In this case, the stream signal may be a signal which is obtained by multiplexing an image signal, a voice signal, or a data signal.

The stream signal output from the demodulator 120 may be input to the signal processing device 170. The signal processing device 170 performs demultiplexing, image/voice signal processing, and the like, and then outputs image to the display 180, and outputs voice to the audio output device 185.

The external device interface 130 may transmit or receive data with a connected external device (not shown), for example, a set top box (STB). To this end, the external device interface 130 may include an A/V input/output device (not shown).

The external device interface 130 may be wired/wireless connected to an external device such as Digital Versatile Disk (DVD), Blu-ray, a game device, a camera, a camcorder, a computer (laptop), a set-top box, etc., and may also perform input/output operation with an external device.

The A/V input/output device may receive image and voice signals from an external device. Meanwhile, a wireless transceiver (not shown) may perform short-range wireless communication with other electronic device.

Through such a wireless transceiver (not shown), the external device interface 130 may exchange data with an adjacent mobile terminal 600. In particular, the external device interface 130 may receive device information, executing application information, application image, and the like from the mobile terminal 600 in a mirroring mode.

The network interface 135 provides an interface for connecting the image display apparatus 100 to a wired/wireless network including the Internet network. For example, the network interface 135 may receive content or data provided by the Internet or a content provider or network operator through a network.

Meanwhile, the network interface 135 may include a wireless transceiver (not shown).

The memory 140 may store programs for processing and controlling each signal in the signal processing device 170 or may store signal-processed image, voice, or data signal.

In addition, the memory 140 may perform a function for temporarily storing image, voice, or data signal input to the external device interface 130. In addition, the memory 140 may store information related to a certain broadcasting channel through a channel storage function such as a channel map.

FIG. 2 shows an embodiment in which the memory 140 is provided separately from the signal processing device 170, but the scope of the present disclosure is not limited thereto. The memory 140 may be included in the signal processing device 170.

The user input interface 150 transmits a signal input by a user to the signal processing device 170, or transmits a signal from the signal processing device 170 to a user.

For example, a user input signal such as power on/off, channel selection, and screen setting may be transmitted/received from the remote control device 200, a user input signal input from a local key (not shown) such as a power key, a channel key, a volume key, or a set value is transmitted to the signal processing device 170, a user input signal input from a sensor device (not shown) that senses a user's gesture is transmitted to the signal processing device 170, or a signal from the signal processing device 170 may be transmitted to a sensor device (not shown).

The signal processing device 170 may demultiplex an input stream through the tuner 110, the demodulator 120, the network interface 135, or the external device interface 130, or may generate and output a signal for outputting image or voice by processing the demultiplexed signals.

For example, the signal processing device 170 may receive a broadcast signal, a HDMI signal, or the like received from the image receiver 105, perform signal processing based on the received broadcast signal or HDMI signal, and output an signal-processed image signal.

The image signal processed by the signal processing device 170 may be input to the display 180, and displayed as an image corresponding to a relevant image signal. In addition, the image signal processed by the signal processing device 170 may be input to an external output device through the external device interface 130.

The voice signal processed by the signal processing device 170 may be output as audio to the audio output device 185. In addition, the voice signal processed by the signal processing device 170 may be input to an external output device through the external device interface 130.

Although not shown in FIG. 2, the signal processing device 170 may include a demultiplexer, an image processor, and the like. That is, the signal processing device 170 may perform various signal processing, and thus may be implemented in the form of a system on chip (SOC). This will be described later with reference to FIG. 3.

In addition, the signal processing device 170 may control overall operations within the image display apparatus 100. For example, the signal processing device 170 may control the tuner 110 to select (tune) an RF broadcast corresponding to a channel selected by a user or a pre-stored channel.

In addition, the signal processing device 170 may control the image display apparatus 100 according to a user command input through the user input interface 150 or an internal program.

Meanwhile, the signal processing device 170 may control the display 180 to display an image. In this case, the image displayed on the display 180 may be a still image or a moving image, and may be a 2D image or a 3D image.

Meanwhile, the signal processing device 170 may display a certain object within an image displayed on the display 180. For example, the object may be at least one of a connected web screen (newspaper, magazine, etc.), an electronic program guide (EPG), various menus, a widget, an icons, a still image, a video, or a text.

Meanwhile, the signal processing device 170 may recognize a user's location based on an image photographed by a photographing device (not shown). For example, the distance (z-axis coordinate) between a user and the image display apparatus 100 may be determined. In addition, x-axis coordinates and y-axis coordinates within the display 180 corresponding to the user's location may be determined.

The display 180 generates a driving signal by converting an image signal, data signal, OSD signal, control signal processed by the signal processing device 170, or an image signal, data signal, control signal, and the like received from the external device interface 130.

Meanwhile, the display 180 may be configured as a touch screen and used as an input device in addition to an output device.

The audio output device 185 receives a voice-processed signal from the signal processing device 170 and outputs it as a voice.

A photographing device (not shown) photographs a user. The photographing device (not shown) may be implemented with a single camera, but is not limited thereto, and may be implemented with a plurality of cameras. Image information photographed by the photographing device (not shown) may be input to the signal processing device 170.

The signal processing device 170 may detect a user's gesture, based on an image photographed by a photographing device (not shown) or a detected signal from a sensor device (not shown), or a combination thereof.

The power supply 190 supplies corresponding power throughout the image display apparatus 100. In particular, the power supply 190 may supply power to the signal processing device 170 that may be implemented in the form of a system on chip (SOC), the display 180 for displaying image, and the audio output device 185 for outputting audio, or the like.

Specifically, the power supply 190 may include a converter that converts AC power to DC power and a DC/DC converter that converts the level of the DC power.

The remote control device 200 transmits an user input to the user input interface 150. To this end, the remote control device 200 may use Bluetooth, radio frequency (RF) communication, infrared (IR) communication, ultra wideband (UWB), ZigBee, or the like. In addition, the remote control device 200 may receive an image, voice, or data signal output from the user input interface 150, and display it on the remote control device 200 or output it as a voice.

Meanwhile, the above-described image display apparatus 100 may be a digital broadcasting receiver capable of receiving fixed or mobile digital broadcasting.

Meanwhile, the block diagram of the image display apparatus 100 shown in FIG. 2 is a block diagram for an embodiment of the present disclosure. Each component of the block diagram may be integrated, added, or omitted according to specifications of the image display apparatus 100 that is actually implemented. That is, if necessary, two or more components may be combined into one component, or one component may be subdivided into two or more components. In addition, functions performed in each block are for explaining an embodiment of the present disclosure, and the specific operation or device does not limit the scope of the present disclosure.

Figure 3:
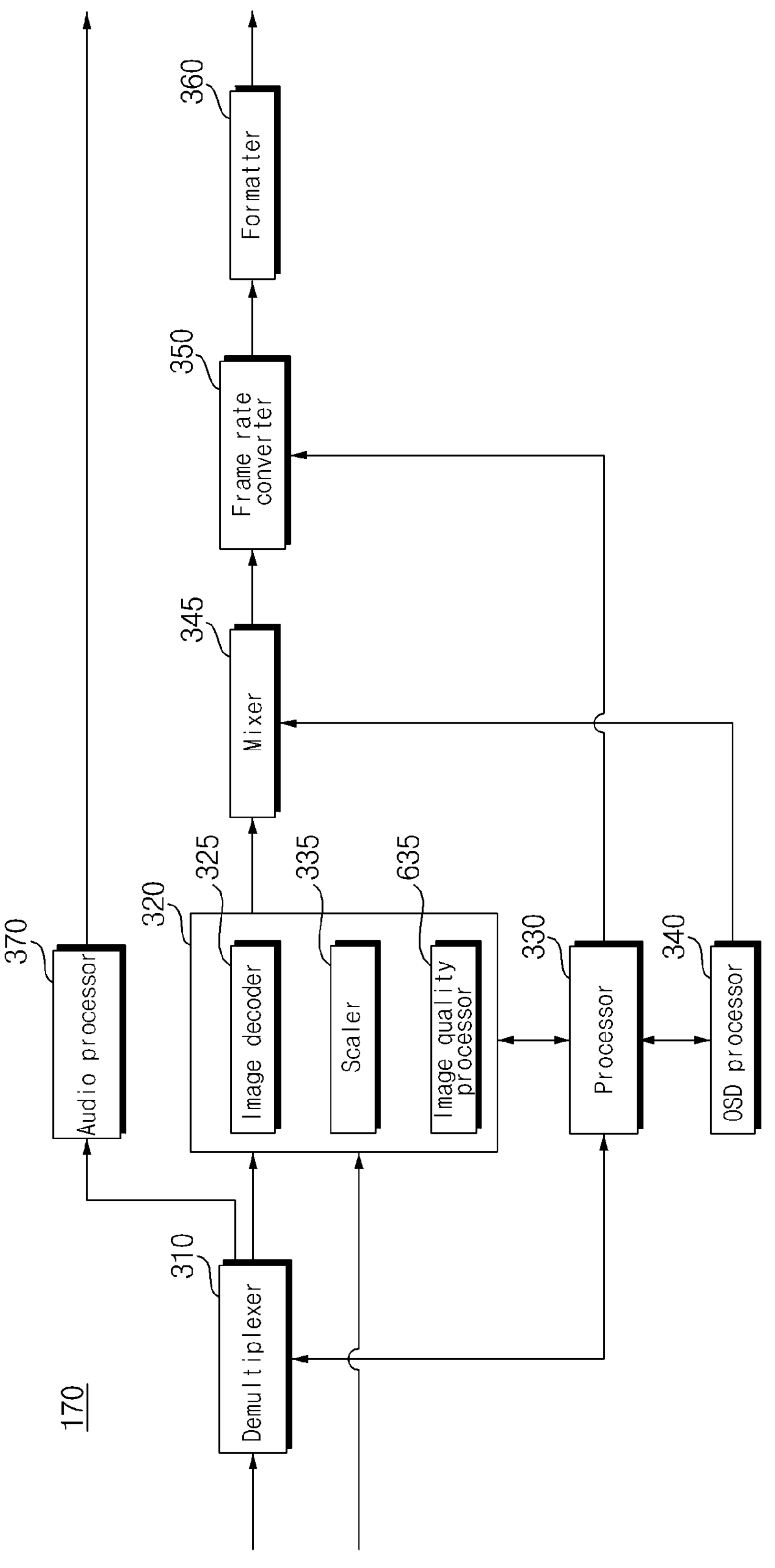
FIG. 3 is an example of an internal block diagram of a signal processing device of FIG. 2.

FIG. 3 is an example of an internal block diagram of the signal processing device of FIG. 2.

Referring to FIG. 3, the signal processing device 170 according to an embodiment of the present disclosure may include a demultiplexer 310, an image processor 320, a processor 330, and an audio processor 370. In addition, a data processor (not shown) may be further included.

The demultiplexer 310 demultiplexes the input stream. For example, when MPEG-2 TS is input, it may be demultiplexed and separated into image, voice, and data signal. Here, the stream signal input to the demultiplexer 310 may be a stream signal output from the tuner 110, the demodulator 120, or the external device interface 130.

The image processor 320 may perform signal processing for an input image. For example, the image processor 320 may perform image processing of an image signal demultiplexed by the demultiplexer 310.

To this end, the image processor 320 may include an image decoder 325, a scaler 335, an image quality processor 635, an image encoder (not shown), an OSD processor 340, a frame rate converter 350, a formatter 360, and the like.

The image decoder 325 decodes the demultiplexed image signal, and the scaler 335 performs scaling so that the resolution of the decoded image signal can be output from the display 180.

The image decoder 325 may include decoders of various standards. For example, it may include an MPEG-2, H.264 decoder, a 3D image decoder for a color image and a depth image, a decoder for a multi-view image, and the like.

The scaler 335 may scale an input image signal that completed image decoding in the image decoder 325 or the like.

For example, the scaler 335 may perform up-scaling when the size or resolution of the input image signal is small, and down-scaling when the size or resolution of the input image signal is large.

The image quality processor 635 may perform image quality processing for an input image signal completed image decoding in the image decoder 325 or the like.

For example, the image quality processor 635 may remove noise from an input image signal, expand the resolution of the gray level of an input image signal, perform image resolution enhancement, perform high dynamic range (HDR) based signal processing, change the frame rate, or perform image quality processing corresponding to panel characteristics, in particular, to an organic light emitting panel.

The OSD processor 340 generates an OSD signal according to a user input or by itself. For example, based on a user input signal, a signal for displaying various types of information in a graphic or text on the screen of the display 180 may be generated. The generated OSD signal may include various data such as a user interface screen of the image display apparatus 100, various menu screens, a widget, and an icon. In addition, the generated OSD signal may include a 2D object or a 3D object.

In addition, the OSD processor 340 may generate a pointer that can be displayed on a display, based on a pointing signal input from the remote control device 200. In particular, such a pointer may be generated by a pointing signal processing device, and the OSD processor 240 may include such a pointing signal processing device (not shown). Obviously, it is also possible that the pointing signal processing device (not shown) is not provided in the OSD processor 240 but is provided separately.

The frame rate converter (FRC) 350 may convert the frame rate of an input image. Meanwhile, the frame rate converter 350 may output intactly without separate frame rate conversion.

Meanwhile, the formatter 360 may change the format of an input image signal into an image signal for display on a display and output the changed image signal.

In particular, the formatter 360 may change the format of the image signal so as to correspond to the display panel.

The processor 330 may control overall operations within the image display apparatus 100 or the signal processing device 170.

For example, the processor 330 may control the tuner 110 to select (tune) an RF broadcast corresponding to a channel selected by a user or a pre-stored channel.

In addition, the processor 330 may control the image display apparatus 100 according to a user command input through the user input interface 150 or an internal program.

In addition, the processor 330 may perform data transmission control with the network interface 135 or the external device interface 130.

In addition, the processor 330 may control operations of the demultiplexer 310 and the image processor 320 within the signal processing device 170.

Meanwhile, the audio processor 370 in the signal processing device 170 may perform audio processing of the demultiplexed voice signal. To this end, the audio processor 370 may include various decoders.

In addition, the audio processor 370 in the signal processing device 170 may process a base, a treble, volume control, and the like.

A data processor (not shown) in the signal processing device 170 may perform data processing of the demultiplexed data signal. For example, if the demultiplexed data signal is an encoded data signal, it can be decoded. The encoded data signal may be electronic program guide information including broadcast information such as a start time and an end time of a broadcast program broadcast on each channel.

Meanwhile, a block diagram of the signal processing device 170 shown in FIG. 3 is a block diagram for one embodiment of the present disclosure. Each component of the block diagram may be integrated, added, or omitted according to specifications of the signal processing device 170 that is actually implemented.

In particular, the frame rate converter 350 and the formatter 360 may be separately provided in addition to the image processor 320.

Figure 4:
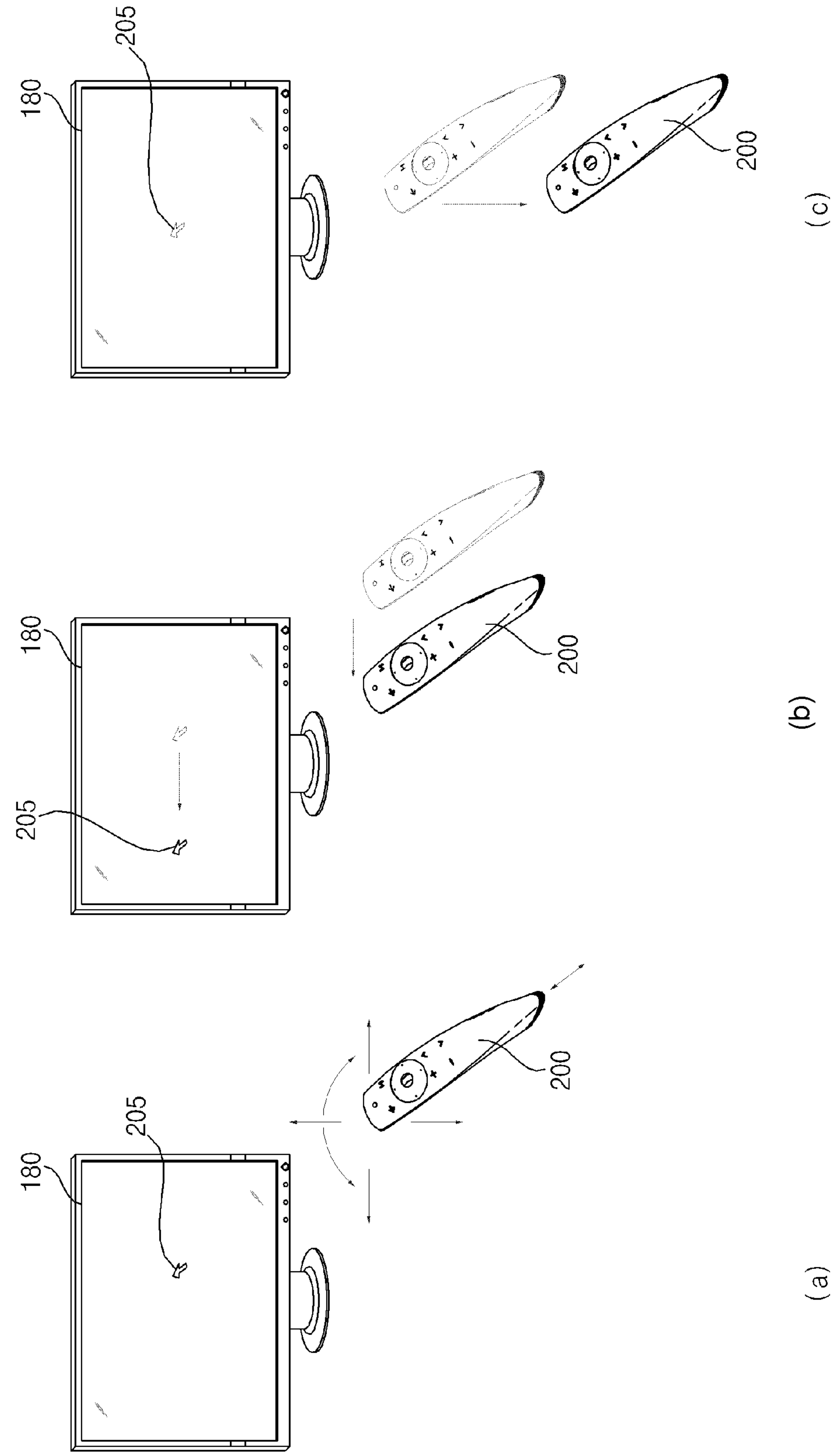
FIG. 4 is a diagram illustrating a control method of a remote control device of FIG. 2.

FIG. 4 is a diagram illustrating a control method of the remote control device of FIG. 2.

As shown in FIG. 4A, it is illustrated that a pointer 205 corresponding to the remote control device 200 is displayed on the display 180.

A user can move or rotate the remote control device 200 in up-down direction, in the left-right direction (FIG. 4B), in the front-rear direction (FIG. 4C). The pointer 205 displayed on the display 180 of the image display apparatus corresponds to the movement of the remote control device 200. As shown in the drawing, since a corresponding pointer 205 is moved and displayed according to movement in a 3D space, such a remote control device 200 may be named a space remote controller or a 3D pointing device.

FIG. 4B illustrates that when a user moves the remote control device 200 to the left, the pointer 205 displayed on the display 180 of the image display apparatus also moves to the left in response thereto.

Information on the movement of the remote control device 200 detected through the sensor of the remote control device 200 is transmitted to the image display apparatus. The image display apparatus may calculate the coordinates of the pointer 205 from information related to the movement of the remote control device 200. The image display apparatus may display the pointer 205 to correspond to the calculated coordinates.

FIG. 4C illustrates a case where a user moves the remote control device 200 away from the display 180 while pressing a specific button in the remote control device 200. Thus, a selection area in the display 180 corresponding to the pointer 205 may be zoomed in and displayed enlarged. Conversely, when a user moves the remote control device 200 to approach the display 180, a selection area within the display 180 corresponding to the pointer 205 may be zoomed out and displayed to be reduced. Meanwhile, when the remote control device 200 moves away from the display 180, the selection area may be zoomed out, and when the remote control device 200 approaches the display 180, the selection area may be zoomed in.

Meanwhile, in a state in which a specific button in the remote control device 200 is pressed, recognition of the up, down, left, and right movements may be excluded. That is, when the remote control device 200 moves away from or approaches the display 180, the up, down, left, and right movements are not recognized, and only forward and rearward movements may be recognized. In a state in which a specific button in the remote control device 200 is not pressed, only the pointer 205 moves according to the up, down, left, and right movements of the remote control device 200.

Meanwhile, the moving speed or moving direction of the pointer 205 may correspond to the moving speed or moving direction of the remote control device 200.

Figure 5:
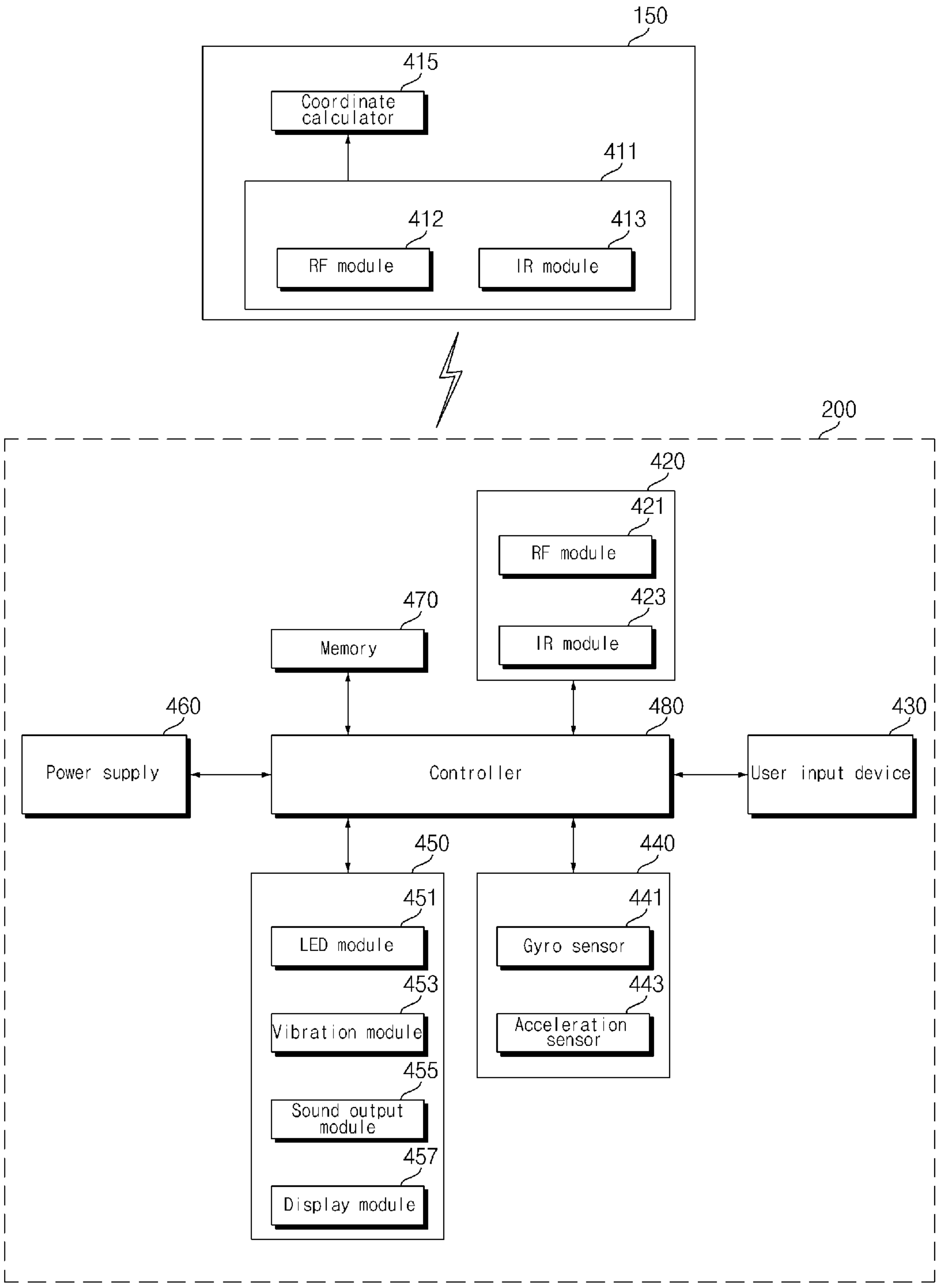
FIG. 5 is an internal block diagram of the remote control device of FIG. 2.

FIG. 5 is an internal block diagram of the remote control device of FIG. 2.

Referring to FIG. 5, the remote control device 200 may include a wireless transceiver 425, a user input device 435, a sensor device 440, an output device 450, a power supply 460, a memory 470, and a controller 480.

The wireless transceiver 425 transmits and receives a signal with any one of the image display apparatuses according to the embodiments of the present disclosure described above. Among image display apparatuses according to embodiments of the present disclosure, one image display apparatus 100 will be described as an example.

In this embodiment, the remote control device 200 may include an RF module 421 capable of transmitting and receiving a signal to and from the image display apparatus 100 according to RF communication standards. In addition, the remote control device 200 may include an IR module 423 capable of transmitting and receiving a signal to and from the image display apparatus 100 according to IR communication standards.

In this embodiment, the remote control device 200 transmits a signal containing information relate to the movement of the remote control device 200 to the image display apparatus 100 through the RF module 421.

In addition, the remote control device 200 may receive a signal transmitted by the image display apparatus 100 through the RF module 421. In addition, if necessary, the remote control device 200 may transmit a command related to power on/off, channel change, volume change, etc. to the image display apparatus 100 through the IR module 423.

The user input device 435 may include a keypad, a button, a touch pad, or a touch screen. A user may input a command related to the image display apparatus 100 to the remote control device 200 by operating the user input device 435. If the user input device 435 has a hard key button, a user may input a command related to the image display apparatus 100 to the remote control device 200 through a push operation of a hard key button. If the user input device 435 has a touch screen, a user may input a command related to the image display apparatus 100 to the remote control device 200 by touching a soft key on the touch screen. In addition, the user input device 435 may include various types of input means that a user can operate, such as a scroll key or a jog key, and the present embodiment does not limit the scope of the present disclosure.

The sensor device 440 may include a gyro sensor 441 or an acceleration sensor 443. The gyro sensor 441 may sense information related to the movement of the remote control device 200.

For example, the gyro sensor 441 may sense information related to the operation of the remote control device 200 based on x, y, and z axes. The acceleration sensor 443 may sense information related to the moving speed of the remote control device 200, and the like. Meanwhile, a distance measurement sensor may be further provided to sense a distance to the display 180.

The output device 450 may output an image or voice signal corresponding to operation of the user input device 435 or a signal transmitted from the image display apparatus 100. Through the output device 450, a user can recognize whether the user input device 435 is operated or whether the image display apparatus 100 is controlled.

For example, the output device 450 includes an LED module 451 that lights up when the user input device 435 is operated or a signal is transmitted and received with the image display apparatus 100 through the wireless transceiver 425, a vibration module that generates vibration 453, a sound output module 455 that outputs sound, or a display 457 that outputs images.

The power supply 460 supplies power to the remote control device 200. The power supply 460 can reduce power waste by stopping power supply when the remote control device 200 does not move for a certain time. The power supply 460 may resume power supply when a certain key provided in the remote control device 200 is operated.

The memory 470 may store various types of programs and application data necessary for controlling or operating the remote control device 200. If the remote control device 200 transmits and receives signals wirelessly through the image display apparatus 100 and the RF module 421, the remote control device 200 and the image display apparatus 100 transmit and receive signals through a certain frequency band. The controller 480 of the remote control device 200 may store information related to a frequency band, and the like that can wirelessly transmit and receive signals with the image display apparatus 100 paired with the remote control device 200 in the memory 470, and refer the information.

The controller 480 may control all matters related to the control of the remote control device 200. The controller 480 may transmit a signal corresponding to a certain key operation of the user input device 435 or a signal corresponding to the movement of the remote control device 200 sensed by the sensor device 440 to the image display apparatus 100 through the wireless transceiver 425.

The user input interface 150 of the image display apparatus 100 may include a wireless transceiver 151 capable of transmitting and receiving signals wirelessly with the remote control device 200, and a coordinate calculator 415 capable of calculating coordinate value of a pointer corresponding to the operation of the remote control device 200.

The user input interface 150 may wirelessly transmit and receive signals with the remote control device 200 through the RF module 412. In addition, through the IR module 413, a signal transmitted by the remote control device 200 according to the IR communication standard may be received.

The coordinate calculator 415 may calculate the coordinate value (x, y) of the pointer 202 to be displayed on the display 180 by correcting the hand shake or error from a signal corresponding to the operation of the remote control device 200 received through the wireless transceiver 151.

The transmission signal of the remote control device 200 input to the image display apparatus 100 through the user input interface 150 is transmitted to the signal processing device 180 of the image display apparatus 100. The signal processing device 180 may determine information related to the operation and key operation of the remote control device 200 from a signal transmitted by the remote control device 200, and control the image display apparatus 100 in response thereto.

As another example, the remote control device 200 may calculate a pointer coordinate value corresponding to the operation and output it to the user input interface 150 of the image display apparatus 100. In this case, the user input interface 150 of the image display apparatus 100 may transmit information related to the received pointer coordinate value to the signal processing device 180 without a separate hand shake or error correction process.

In addition, as another example, unlike the drawing, the coordinate calculator 415 may be provided inside the signal processing device 170 instead of the user input interface 150.

Figure 6:
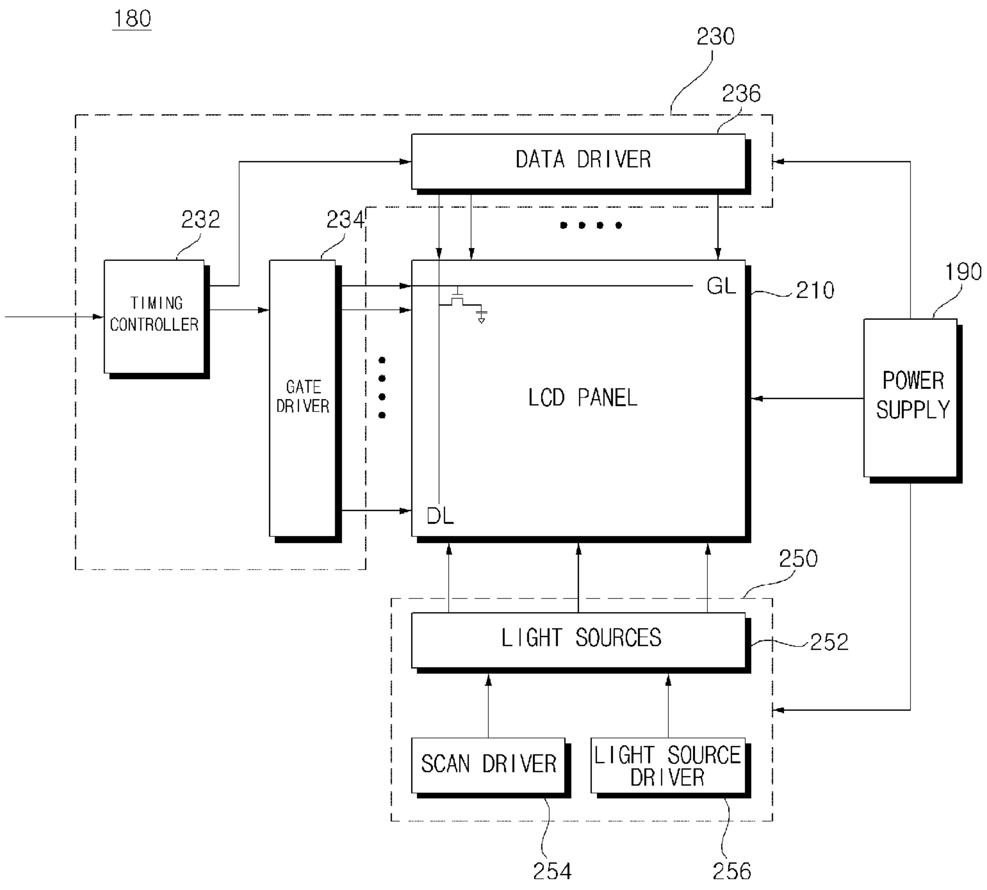
FIG. 6 is a diagram showing an example of a power supply of FIG. 2 and the inside of a display.

FIG. 6 is a diagram showing an example of a power supply of FIG. 2 and the inside of a display.

Referring to FIG. 6, a display 180 based on a liquid crystal display panel (LCD display panel) may include a liquid crystal display panel 210, a driving circuit 230, and a backlight 250.

In order to display an image, the liquid crystal display panel 210 may include a first substrate on which a plurality of gate lines GL and data lines DL are disposed to intersect with each other in a matrix form, and a thin film transistor and a pixel electrode connected thereto are formed in an intersecting area, a second substrate provided with a common electrode, and a liquid crystal layer formed between the first substrate and the second substrate.

The driving circuit 230 drives the liquid crystal display panel 210 through a control signal and a data signal supplied from the signal processing device 170 of FIG. 2. To this end, the driving circuit 230 includes a timing controller 232, a gate driver 234, and a data driver 236.

The timing controller 232 receives a control signal, a R, G, B data signal, and a vertical synchronization signal Vsync from the signal processing device 170, controls the gate driver 234 and the data driver 236 in response to the control signal, rearrange the R, G, B data signal, and provides it to the data driver 236.

Under the control of the gate driver 234, the data driver 236, and the timing controller 232, a scan signal and an image signal are supplied to the liquid crystal display panel 210 through a gate line GL and a data line DL.

The backlight 250 supplies light to the liquid crystal display panel 210. To this end, the backlight 250 may include a plurality of light sources 252 as a light source, a scan driver 254 controlling scanning driving of the light source 252, and a light source driver 256 that turns on/off the light source 252.

In a light transmittance of the liquid crystal layer is adjusted by an electric field formed between a pixel electrode and a common electrode of the liquid crystal display panel 210, a certain image is displayed by using the light emitted from the backlight 250.

The power supply 190 may supply a common electrode voltage Vcom to the liquid crystal display panel 210, and supply a gamma voltage to the data driver 236. In addition, driving power for driving the light source 252 may be supplied to the backlight 250.

Figure 7A:
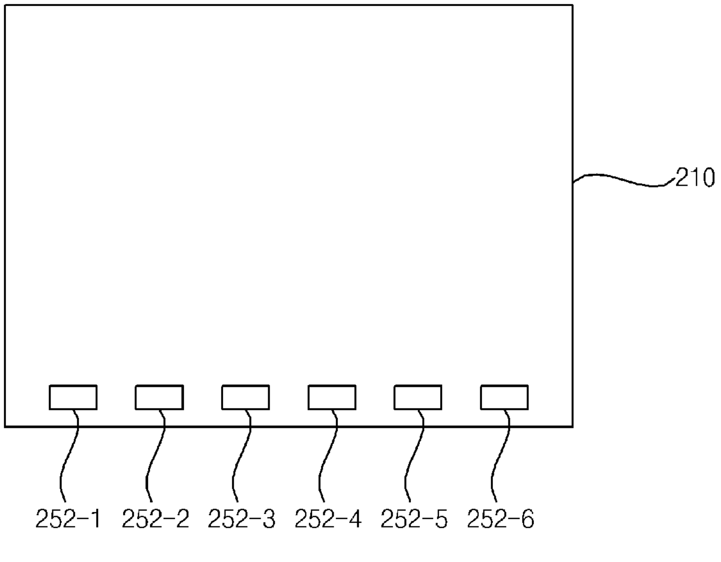
FIG. 7A is a diagram illustrating an example of a light source arrangement of FIG. 6.

FIG. 7A is a diagram illustrating an example of a light source arrangement of FIG. 6.

Referring to FIG. 7A, a plurality of light sources 252-1 to 252-6 may be respectively disposed in a lower edge of the rear surface of the liquid crystal display panel 210. This may be referred to as an edge-type structure.

In FIG. 7A, it is exemplified that six plurality of light sources 252-1 to 252-6 are spaced apart from each other and disposed.

Meanwhile, each of the plurality of light sources 252-1 to 252-6 may include a plurality of light emitting diodes (LEDs). Meanwhile, light is irradiated to the entire surface of the liquid crystal display panel 210 by a diffusion plate that diffuses light, a reflector that reflects light, and an optical sheet that polarizes, points, or diffuses light.

Meanwhile, each of the plurality of light sources 252-1 to 252-6 may include a plurality of light emitting diodes (LEDs) connected in series with each other.

Figure 7B:
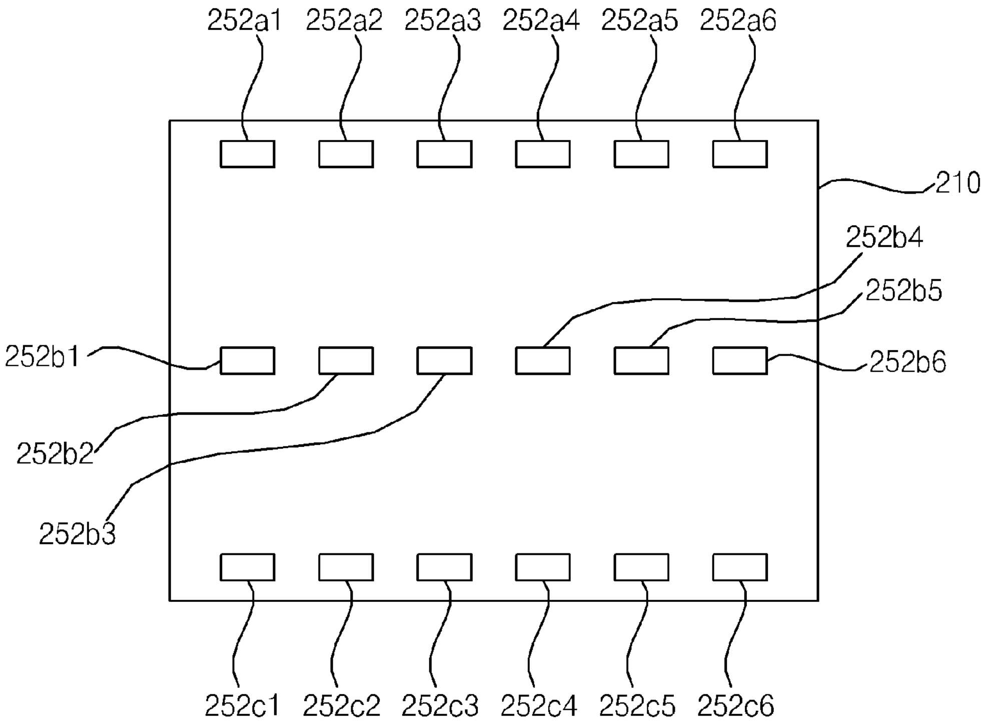
FIG. 7B is a diagram illustrating another example of a light source arrangement of FIG. 6.

FIG. 7B is a diagram illustrating another example of a light source arrangement of FIG. 6.

Referring to FIG. 7B, a plurality of light sources 252*a*1 to 252*a*6 may be disposed in the upper side of the rear surface of the liquid crystal display panel 210, a plurality of light sources 252*b*1 to 252*b*6 may be disposed in the center of the rear surface, and a plurality of light sources 252*c*1 to 252*c*6 may be disposed in the lower side of the rear surface. This may be called a direct type structure.

In FIG. 7B, it is illustrated that eighteen light sources 252*a*1 to 252*a*6, 252*b*1 to 252*b*6, and 252*c*1 to 252*c*6 are disposed spaced apart from each other.

Meanwhile, each of the plurality of light sources 252*a*1 to 252*a*6, 252*b*1 to 252*b*6, and 252*c*1 to 252*c*6 may include a plurality of light emitting diodes (LEDs). Meanwhile, light is irradiated to the entire surface of the liquid crystal display panel 210 by a diffusion plate that diffuses light, a reflection plate that reflects light, an optical sheet that polarizes, points, or diffuses light, and the like.

Meanwhile, each of the plurality of light sources (252*a*1 to 252*a*6, 252*b*1 to 252*b*6, and 252*c*1 to 252*c*6) may include at least one light emitting diode (LED) connected in series with each other.

Figure 8:
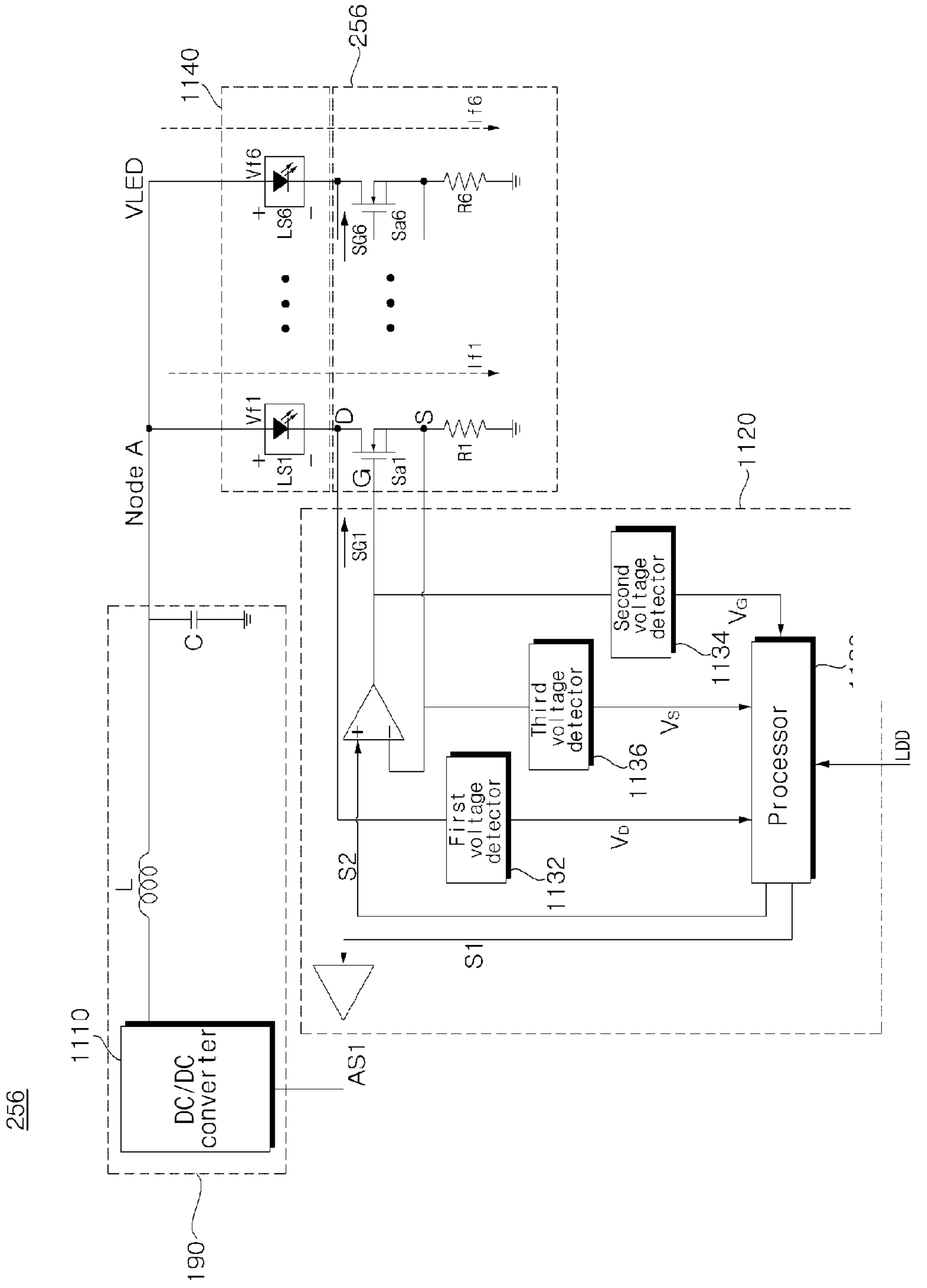
FIG. 8 is an example of an internal circuit diagram of a light source driver according to an embodiment of the present disclosure.

FIG. 8 is an example of an internal circuit diagram of a light source driver according to an embodiment of the present disclosure.

FIG. 8 is an example of an internal circuit diagram of a light source driver according to an embodiment of the present disclosure.

Referring to FIG. 8, the light source driver 256 may include a power supply 190 that supplies a common power source VLED to a plurality of light sources (LS1 to LS6) 1140 connected in parallel with each other, a light source driver 256 that drives the plurality of light sources (LS1 to LS6) 1140, and a driving signal processing device 1120 that controls the light source driver 256.

Here, each of the light sources LS1 to LS6 represents a light source, and each light source may include a plurality of LEDs in a series manner.

Meanwhile, as the resolution of the image display apparatus 100 increases up to High Definition (HD), Full HD, Ultra High Definition (UHD), 4K, 8K, etc., the number of LEDs may increase.

Meanwhile, when using the high-resolution display panel 210, in order to improve contrast, based on local dimming data, it is preferable that it is controlled to flow the level-changed current (If), for each of the plurality of light sources 252-1 to 252-6 among the plurality of light sources 252, According to this, by allowing the level-changed current to flow in proportion to the local dimming data, light of different luminance according to the local dimming data is output for each of the plurality of light sources 252-1 to 252-6.

Accordingly, due to the current (If) having an increased level, the luminance of a bright portion becomes brighter and the luminance of a dark portion becomes darker. Thus, contrast at the time of displaying an image is improved, and sharpness at the time of displaying an image is improved.

The power supply 190 outputs a common voltage VLED to a plurality of light sources. To this end, the power supply 190 may include a DC/DC converter 1110 for level-converting and outputting DC power, an inductor L for removing harmonics, etc., and a capacitor C for storing DC power.

The voltage across the capacitor C corresponds to the voltage supplied between a node A and a ground terminal. This may correspond to the voltage applied to a plurality of light sources (LS1 to LS6) 1140, a plurality of switching elements (Sa1 to Sa6), and the resistance elements (R1 to R6). That is, the voltage of node A is a common voltage supplied to the plurality of light sources LS1 to LS6, and may be referred to as a VLED voltage as shown in the drawing.

The VLED voltage is equal to the sum of the driving voltage Vf1 of a first light source LS1, the voltage across a first switching element Sa, and the voltage consumed by a first resistance element Ra.

Alternatively, the VLED voltage is equal to the sum of the driving voltage Vf2 of a second light source LS2, the voltage across a second switching element Sa2, and the voltage consumed by a second resistance element Rb. Alternatively, the VLED voltage is equal to the sum of the driving voltage Vf6 of a sixth light source LS6, the voltage across a sixth switching element Sa6, and the voltage consumed by a n-th resistor element Rn.

Meanwhile, as the resolution of the display panel 210 increases, the backlight driving voltage Vf1 to Vf6 increases, and the driving current If1 to If6 flowing through the backlight also increases.

Meanwhile, the driving signal processing device 1120 includes a first voltage detector 1132 that detects the voltage VD of each drain terminal G of the plurality of switching elements Sa1 to Sa6 implemented by FET, etc.

Meanwhile, the drive signal processing device 1120 may further include a second voltage detector 1134 that detects the voltage VG of each gate terminal G and a third voltage detector 1136 that detects the voltage VS of each source terminal S.

Then, the driving signal processing device 1120 may compare each drain terminal voltage VD detected at each drain terminal G of the plurality of switching elements Sa1 to Sa6, and based on the lowest drain terminal voltage among them, generate a target driving current flowing through the plurality of light sources 1140, and output a switching control signal SG corresponding to the generated target driving current.

When the switching control signal SG is input to a comparator and is greater than the detected voltage VD of the source terminal, it is output from the comparator and input to the gate terminal G. Thus, based on the switching control signal SG, the switching element is driven.

Meanwhile, in order to generate such a switching control signal, the driving signal processing device 1120 may include the processor 1130 generating a switching control signal for driving each gate terminal of the plurality of switching elements Sa1 to Sa6, based on each drain terminal voltage of the plurality of switching elements Sa1 to Sa6.

Meanwhile, the processor 1130 may change the amplitude of the switching control signal SG, based on the magnitude of each drain terminal voltage VD of the plurality of switching elements Sa1 to Sa6.

Figure 9:
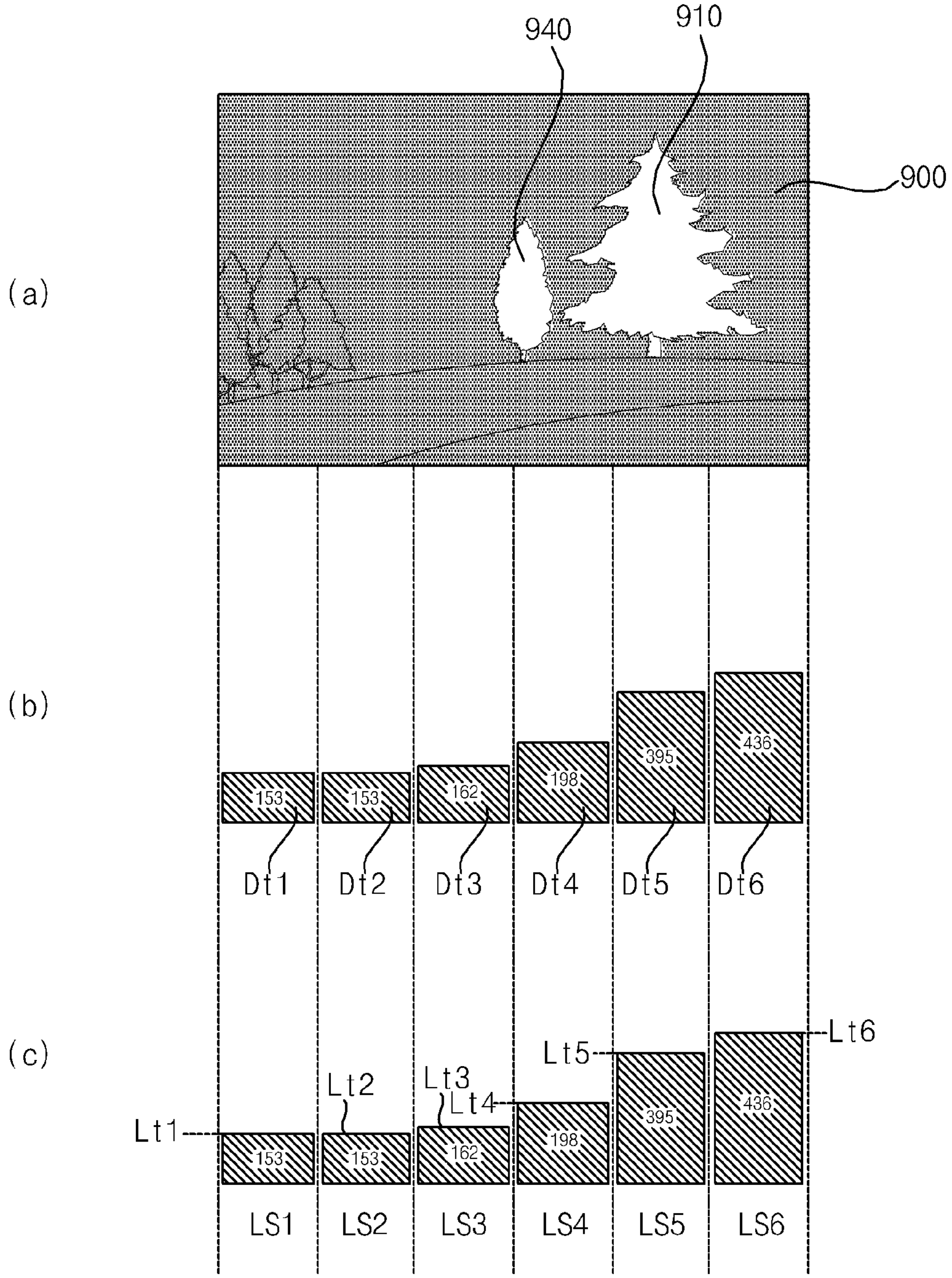
FIG. 9 is a diagram for explaining an operation of a processor of FIG. 8.

FIG. 9 is a diagram for explaining an operation of a processor of FIG. 8.

First, FIG. 9A(a) is a diagram illustrating an example of an input image 900. The input image 900 in FIG. 9 is mostly dark, but some objects 940 and 910 have a bright area.

Accordingly, when the plurality of light sources LS1 to LS6 are spaced apart from each other on the rear surface of the display panel 210, approximately, it may be set that the luminance of first to third light sources LS1 to LS3 is low, and the luminance of a fourth light source LS4 increases, and then the luminance of a fifth light source LS5 and a sixth light source LS6 significantly increases.

To this end, the processor 1130 described in FIG. 8, as shown in FIG. 9A(b), the amplitudes of the switching control signals applied to the switching elements Sa1 to Sa6 that respectively drive the plurality of light sources LS1 to LS6 can be controlled to be Dt1 to Dt6, respectively.

Here, Dt1 to Dt6 may be exemplified as 34%, 34%, 36%, 44%, 88%, or 97% of the maximum amplitude.

Accordingly, the luminance output from the plurality of light sources LS1 to LS6 may be Lt1 to Lt6, as shown in FIG. 9A(c).

Here, Lt1 to Lt6 may be exemplified as 153, 153, 162, 198, 395, and 436 nit, as in the drawing.

Meanwhile, the processor 1130 may control the light sources LS1 to LS6 to be driven based on a first frequency corresponding to the vertical synchronization signal Vsync of the panel 210. This will be described with reference to FIGS. 10A to 10E.

FIGS. 10A to 10E are diagrams illustrating various switching control signals output from the processor of FIG. 8.

Figure 10A:
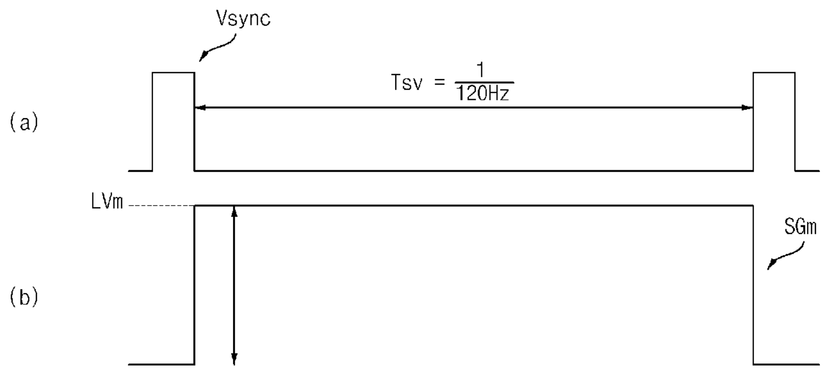
FIG. 10A to 10E are diagrams illustrating various switching control signals output from the processor of FIG. 8.

Referring to the drawings, FIG. 10A illustrates that the first frequency corresponding to the vertical synchronization signal Vsync of the panel 210 is 120 Hz.

The processor 1130 of FIG. 8 may output a switching control signal Ggm having a variable pulse amplitude or pulse level during a Tsv period corresponding to the first frequency.

Meanwhile, the output switching control signal Ggm is input to the gate terminal of the plurality of switching elements Sa1 to Sa6, and the amount of light emitted from the light source LS1 to LS6 is changed according to the pulse amplitude or pulse level.

Figure 10B:
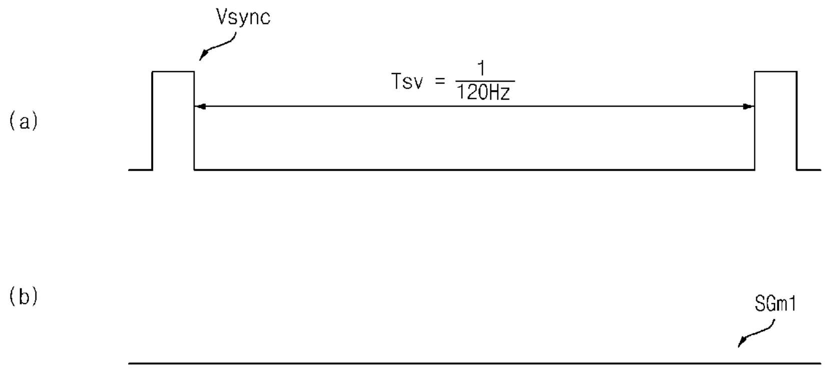

FIG. 10B illustrates a switching control signal Ggm1 having a pulse amplitude or pulse level of 0, during a Tsv period corresponding to the first frequency.

Figure 10C:
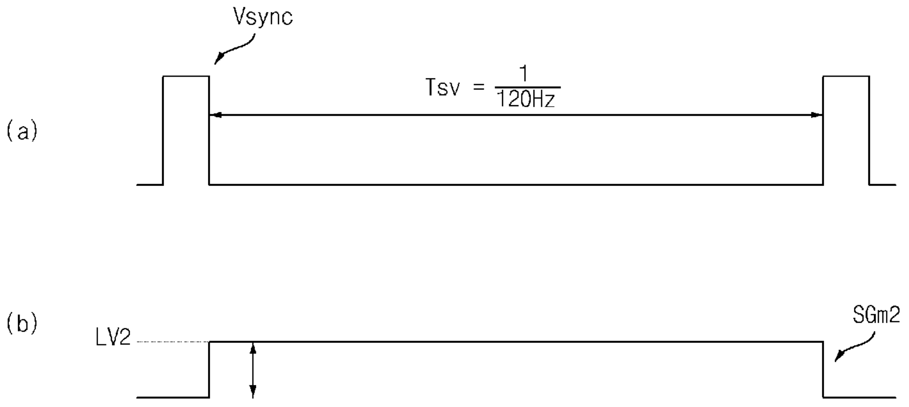

FIG. 10C illustrates a switching control signal Ggm2 having a pulse amplitude or pulse level LV2 that is greater than 0, during the Tsv period corresponding to the first frequency.

Figure 10D:
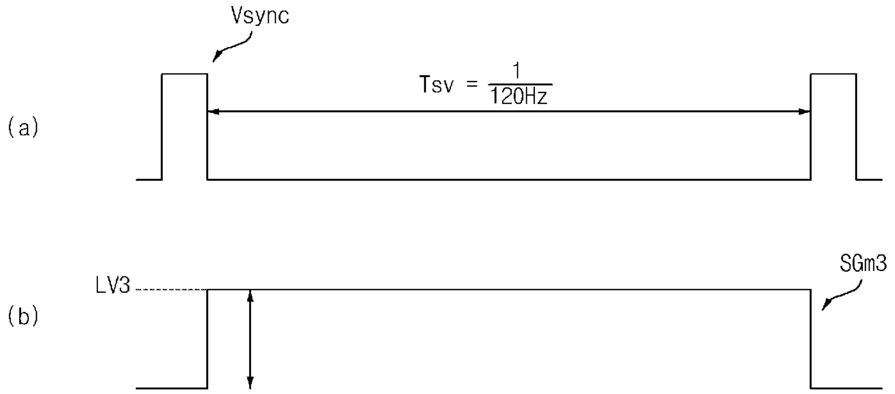

FIG. 10D illustrates a switching control signal Ggm3 having a pulse amplitude or pulse level LV3 that is greater than LV2, during the Tsv period corresponding to the first frequency.

Figure 10E:
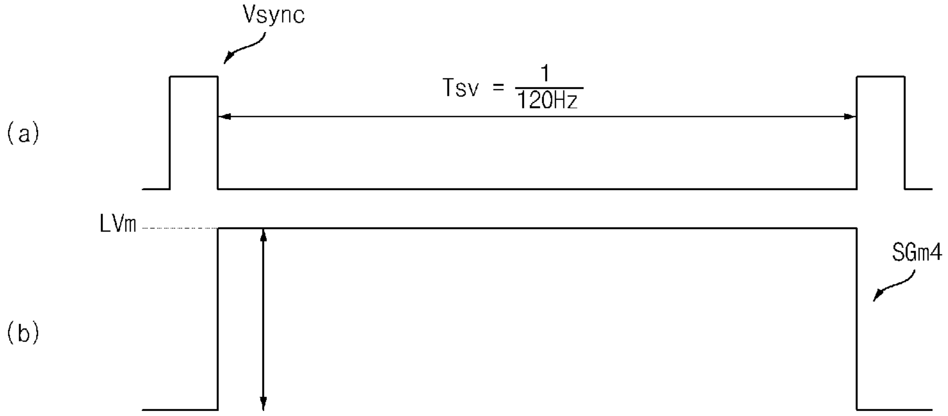

FIG. 10E illustrates a switching control signal Ggm4 having a pulse amplitude or pulse level LV4 that is greater than LV3, during the Tsv period corresponding to the first frequency.

FIGS. 10B to 10E illustrate a switching control signal of various levels output from the processor 1130 of FIG. 8, but are not limited thereto, and implementation of more levels of switching control signals is possible.

Meanwhile, when a light source based on a switching control signal having variable amplitude is driven, there is a problem in that image sharpness during image display may be lowered than when a light source based on a variable pulse width based switching control signal is driven. Accordingly, the present disclosure proposes a method for improving the sharpness of an image when a light source based on a switching control signal having variable amplitude is driven. This will be described with reference to FIG. 11 below.

Figure 11:
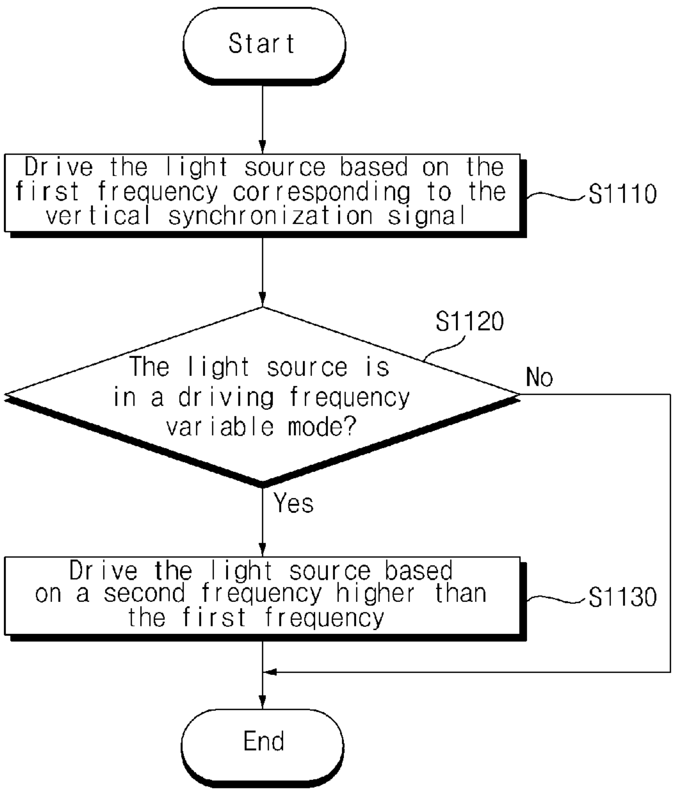
FIG. 11 is a flowchart illustrating an operating method of an image display apparatus according to an embodiment of the present disclosure.

FIG. 11 is a flowchart illustrating an operating method of an image display apparatus according to an embodiment of the present disclosure, and FIGS. 12A to 18 are diagrams for explaining an operating method of FIG. 11.

First, referring to FIG. 11, the processor 1130 of the image display apparatus 100 drives the light source (LS1 to LS6) based on the first frequency corresponding to the vertical synchronization signal Vsync (S1110).

Figure 12A:
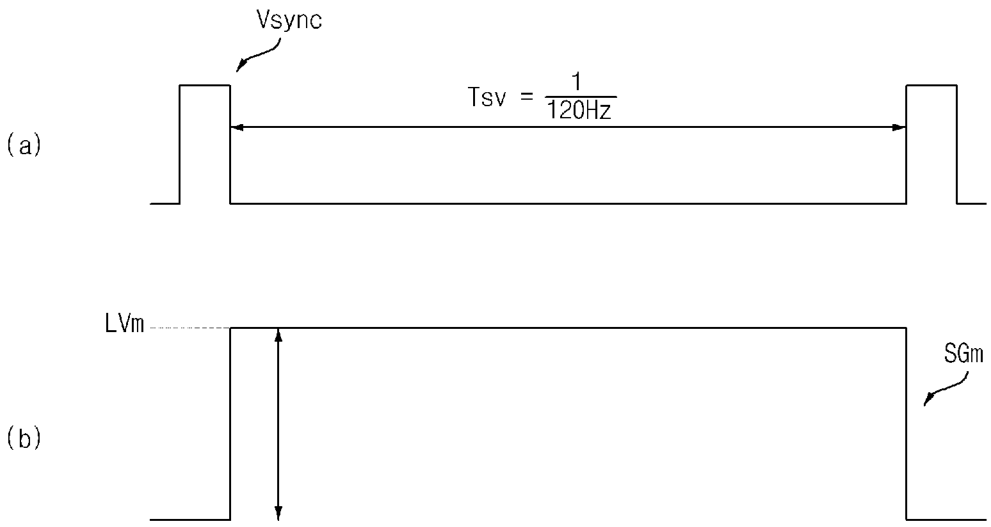
FIGS. 12A to 18 are diagrams for explaining an operating method of FIG. 11.

For example, as shown in FIG. 12A, the processor 1130 may output a switching control signal Ggm having a variable pulse amplitude or pulse level, during the Tsv period corresponding to the first frequency (e.g. 120 Hz).

Accordingly, the light source LS1 to LS6 is driven based on the first frequency, and outputs constant light during the Tsv period based on the switching control signal having a constant level.

Meanwhile, the level of the switching control signal Ggm may be changed for each TSv period.

Next, the processor 1130 of the image display apparatus 100 determines whether the light source is in a driving frequency variable mode (S1120), and if applicable, drives the light source LS1 to LS6 based on a second frequency higher than the first frequency (S1130).

For example, when it is in a movie mode where the movement of the input image is high, or a broadcasting image display mode, or when the average luminance level of the input image is greater than or equal to a reference value, the processor 1130 of the image display apparatus 100 can control the light source to operate in a driving frequency variable mode.

Meanwhile, the processor 1130 may drive the switching elements Sa1 to Sa6 based on the second frequency when the light sources LS1 to LS6 is a driving frequency variable mode.

In addition, the processor 1130 may change the level of the switching control signals SG1 to SG6 applied to the switching element Sa1 to Sa6, for each period corresponding to the second frequency.

As described above, when a switching control signal having a different level is output for each period corresponding to the second frequency, the amount of light output from the light source varies, so that the sharpness of an image at the time of displaying image can be improved.

Specifically, the processor 1130 may change the level of the switching control signal SG1 to SG6 applied to the switching element Sa1 to Sa6, for every second period corresponding to the second frequency during the first period corresponding to the first frequency.

Meanwhile, the processor 1130 may set the multiplied second frequency by multiplying the first frequency.

Figure 12B:
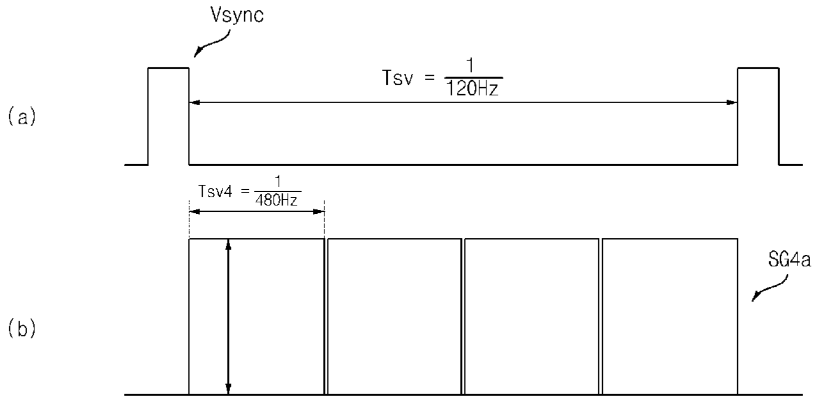
Figure 12C:
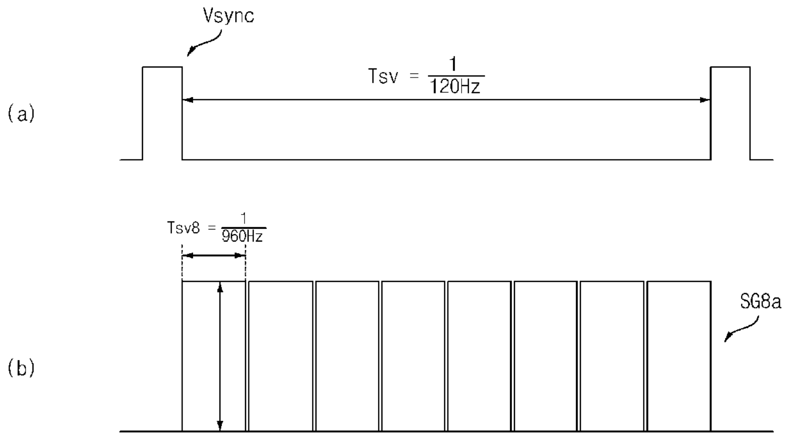
Figure 12D:
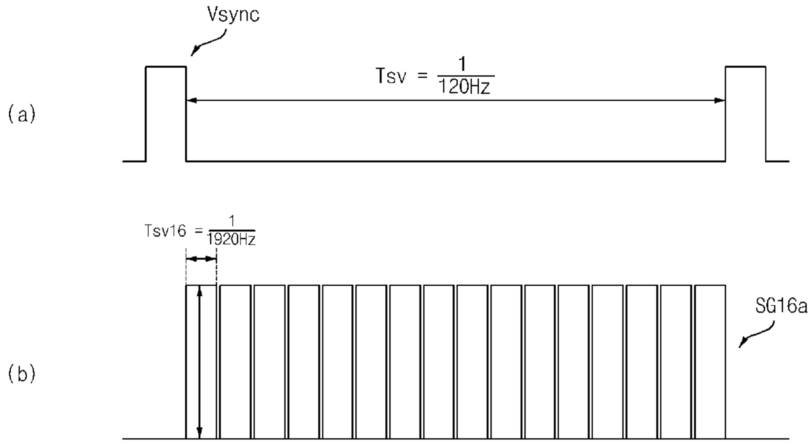

For example, when the first frequency is 120 Hz, the processor 1130 may set 480 Hz multiplied by 4 as the second frequency as shown in FIG. 12B, set 960 Hz multiplied by 8 as the second frequency as shown in FIG. 12C, or set 1920 Hz multiplied by 16 as the second frequency as shown in FIG. 12D.

Accordingly, the processor 1130 may output the 480 Hz-based switching control signal SG4*a* multiplied by 4 as shown in FIG. 12B, output the 960 Hz-based switching control signal SG8*a* multiplied by 8 as shown in FIG. 12C, or output the 1920 Hz-based switching control signal SG4*a* multiplied by 16 as shown in FIG. 12D.

Thus, the sharpness of the image may be improved by changing the driving frequency of the light source through frequency multiplication. In particular, when a light source is driven based on a switching control signal having variable amplitude, the sharpness of the image may be improved.

Meanwhile, during the first period Tsv corresponding to the first frequency, the processor 1130 may control the level of the switching control signal SG1 to SG6 applied to the switching element Sa1 to Sa6 to be sequentially increased or gradually decreased.

That is, the processor 1130 may control the level of the switching control signal SG1 to SG6 to be sequentially increased or gradually decreased, for every second period corresponding to the second frequency during the first period Tsv corresponding to the first frequency. Accordingly, when the light source is driven based on the switching control signal (SG) having variable amplitude, the sharpness of the image can be improved.

Meanwhile, the processor 1130 may control the level of the current flowing through the light source to be changed during the first period Tsv corresponding to the first frequency.

That is, the processor 1130 may control the level of the current flowing through the light source to be changed for every second period corresponding to the second frequency during the first period Tsv corresponding to the first frequency. Accordingly, when the light source is driven based on the switching control signal (SG) having variable amplitude, the sharpness of the image can be improved.

Meanwhile, the processor 1130 may control the level of the current flowing through the light source to be sequentially increased or gradually decreased, during the first period Tsv corresponding to the first frequency.

That is, the processor 1130 may control the level of the current flowing through the light source to be sequentially increased or gradually decreased, for every second period corresponding to the second frequency during the first period Tsv corresponding to the first frequency. Accordingly, when the light source is driven based on the switching control signal (SG) having variable amplitude, the sharpness of the image can be improved.

Figure 13A:
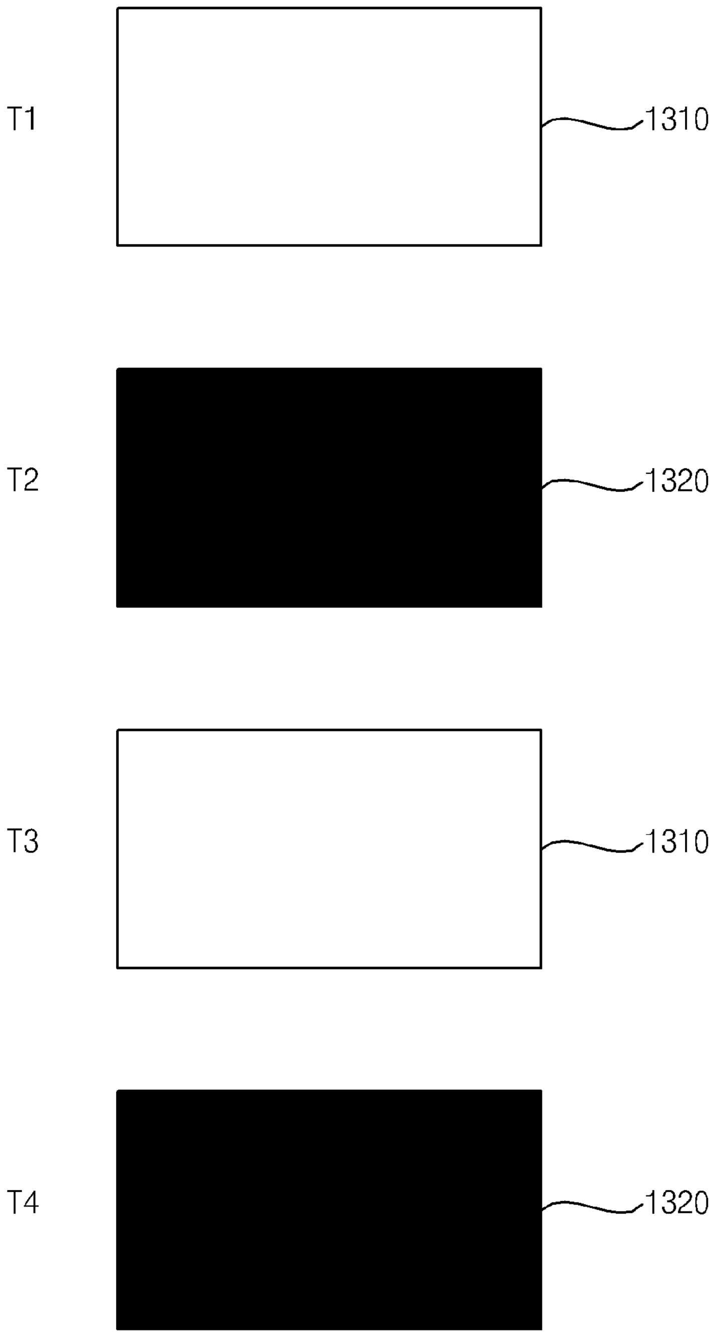

FIG. 13A illustrates that a white image 1310 and a black image 1320 are sequentially displayed.

Referring to FIG. 13A, the white image 1310 may be displayed during T1, the black image 1320 may be displayed during T2, the white image 1310 may be displayed during T3, and the black image 1320 may be displayed during T4.

Figure 13B:
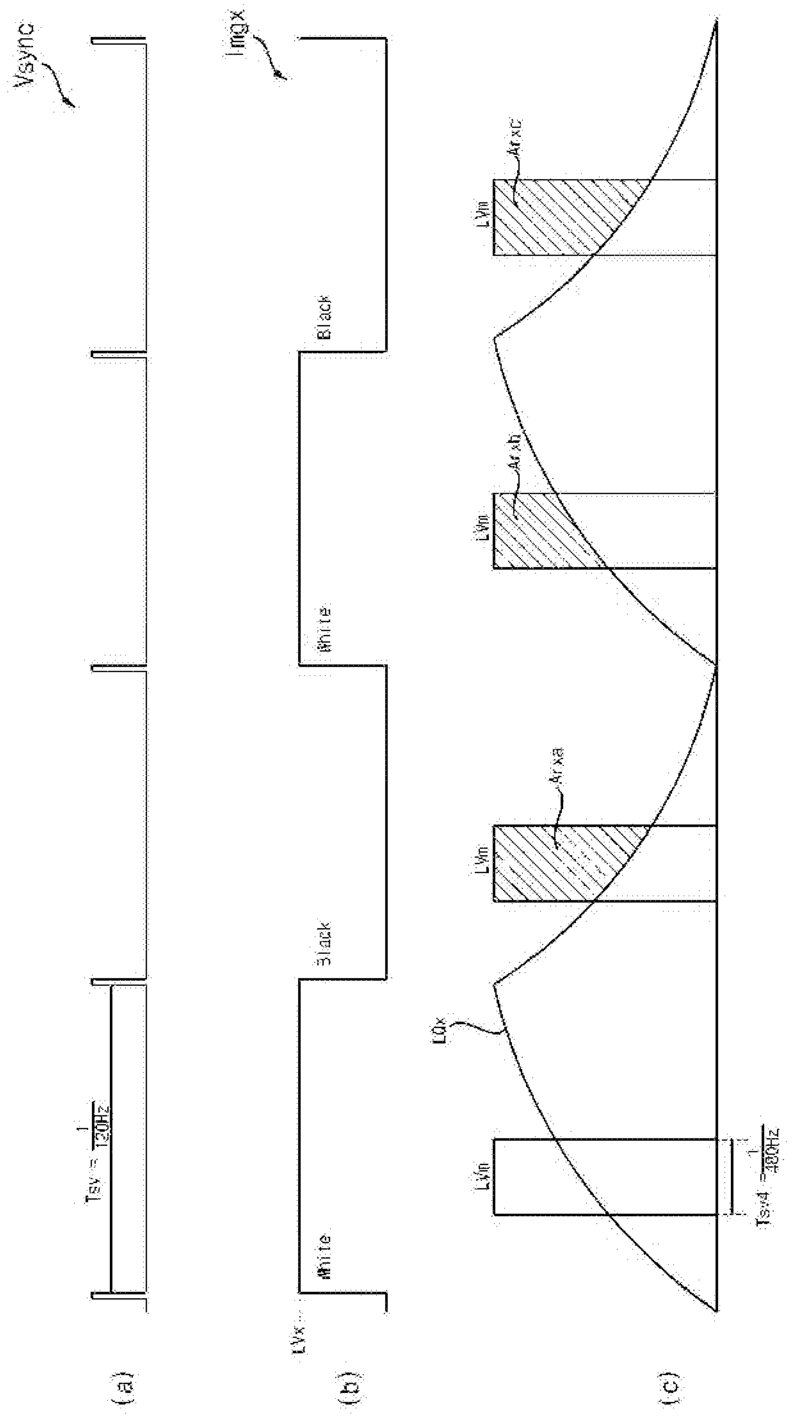

FIG. 13B is a diagram illustrating a vertical synchronization signal Vsync, an image signal Imgx, a liquid crystal response curve LQx, and the operation of light source, during a period T1 to T4.

Referring to FIG. 13B, the light source LS1 to LS6 may be driven in response to a second frequency four times a first frequency corresponding to the vertical synchronization signal Vsync.

Meanwhile, the liquid crystal inside the liquid crystal display panel 210 operates in response to a high level-low level of the image signal Imgx of FIG. 13B (b).

The liquid crystal response curve LQx corresponds to the image signal Imgx of FIG. 13B(b).

Meanwhile, since the driving speed of the liquid crystal is not fast due to the nature of the liquid crystal, as shown in FIG. 13B, it is gradually increased and then gradually decreased.

Meanwhile, when the light source LS1 to LS6 is driven in response to the second frequency, the amount of light of LVm may be output only in one of four sections within the Tsv period. That is, the amount of light of LVm can be output only for a period of 1/480 Hz.

Meanwhile, as shown in the hatched portion of the light amount LVm in FIG. 13B(c), the possibility of dual image display due to cross talk increases, due to the light amount of the light source exceeding the level of the liquid crystal response curve LQx.

Figure 13C:
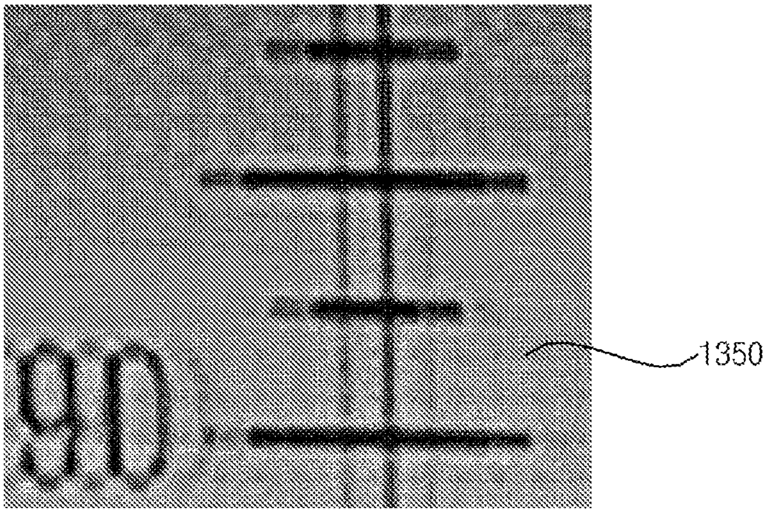

FIG. 13C is a diagram illustrating a dual image 1350 according to the light source driving method of FIG. 13B.

Therefore, in order to remove the dual image 1350 as shown in FIG. 13C, the embodiment of the present disclosure suggests a method of controlling the level of the switching control signal SG1 to SG6 applied to the switching element Sa1 to Sa6 to be sequentially increased or gradually decreased.

For example, during a first frame period, in case in which a first area of the panel 210 displays the white image 1310 and the first area of the panel 210 displays the black image 1320 during a second frame period after the first frame period, the processor 1130 may control the first light source corresponding to the first area to output gradually increasing light during the first frame period, and control the first light source corresponding to the first area to output gradually decreasing light during the second frame period.

Meanwhile, in response to a liquid crystal response speed pattern of the liquid crystal panel 210, the processor 1130 may control the first light source corresponding to the first area to output light that gradually increases or gradually decreases.

Specifically, the processor 1130 may control the amount of light of the light source to be output in response to the liquid crystal response speed pattern of the liquid crystal panel 210.

Meanwhile, the processor 1130 may control the light change rate of the first light source corresponding to the first area to be less than the liquid crystal response speed change rate of the liquid crystal panel 210.

Meanwhile, the processor 1130 may control the light change rate during the second frame period to be greater than the light change rate during the first frame period.

Specifically, the processor 1130 may control the gradual light change rate during the second frame period to be greater than the gradual light change rate during the first frame period.

Figure 14A:
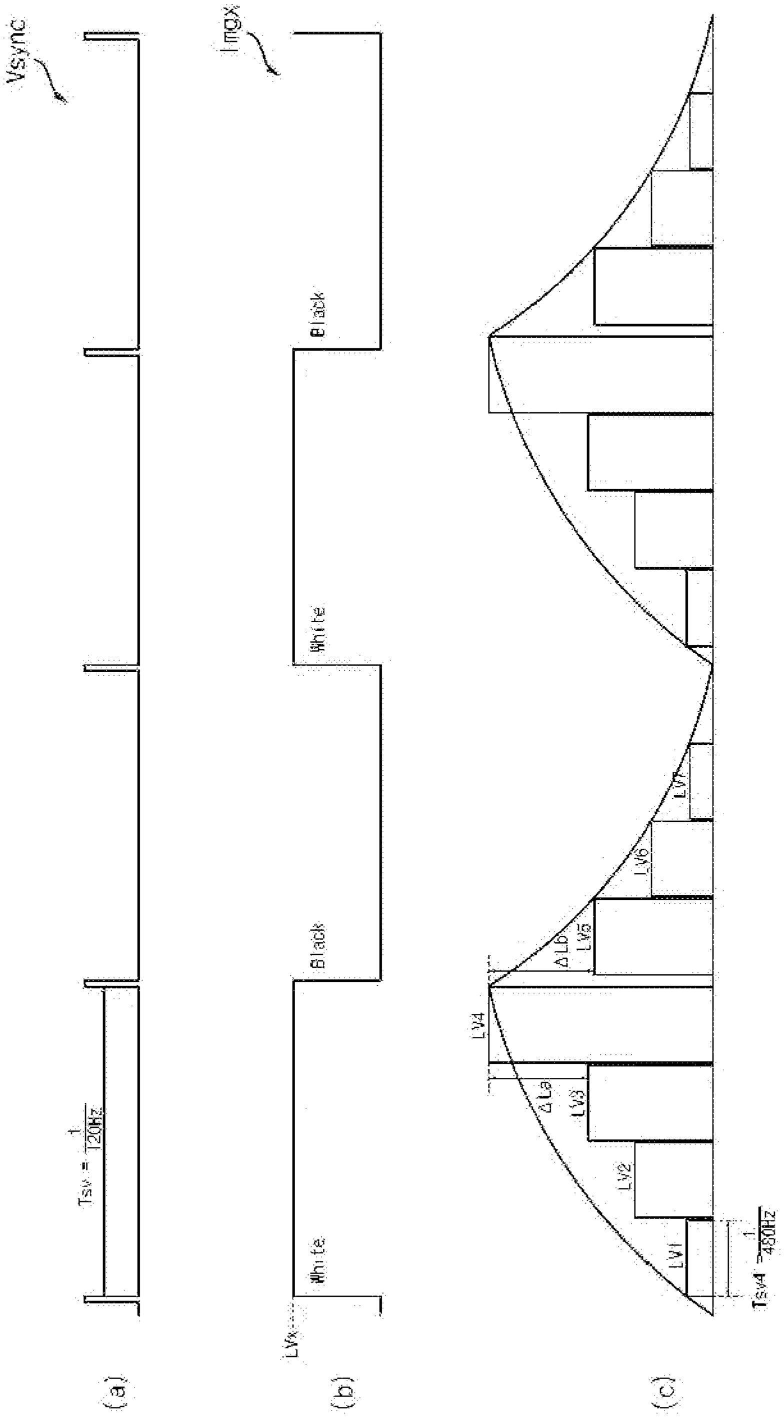

FIG. 14A is a diagram illustrating a vertical synchronization signal Vsync, an image signal Imgx, a liquid crystal response curve LQx, and the operation of light source, during a period T1 to T4.

Referring to FIG. 14A, the light source LS1 to LS6 may be driven in response to the second frequency four times the first frequency corresponding to the vertical synchronization signal Vsync.

FIG. 13A, when the white image 1310 is displayed during T1, the black image 1320 is displayed during T2, the white image 1310 is displayed during T3, and the black image 1320 is displayed during T4, the liquid crystal inside the liquid crystal display panel 210 operates in response to the high level-low level of the image signal Imgx of FIG. 14A(b).

The liquid crystal response curve LQx of FIG. 14A(c) corresponds to the image signal Imgx of FIG. 14A(b).

Meanwhile, since the driving speed of the liquid crystal is not fast due to the nature of the liquid crystal, as shown in the drawing, it is gradually increased and then gradually decreased.

Meanwhile, when the light source LS1 to LS6 is driven in response to the second frequency, it is preferable to output a gradually increasing amount of light for 4 sections within the first Tsv period so as to display a white image.

The drawing illustrates that, for displaying a white image, during every TSv4 period, the light amount that gradually increases in the order of LV1, LV2, LV3, and LV4 is output.

Next, when the light source LS1 to LS6 is driven in response to the second frequency, it is preferable to output a gradually decreasing light amount for 4 sections within the second Tsv period so as to display a black image.

The drawing illustrates that, for displaying a black image, during every TSv4 period, the light amount that gradually decreases in the order of LV5, LV6, LV7, and 0 is output.

According to this, unlike FIG. 13B(c), since the light amount of the light source exceeding the level of the liquid crystal response curve LQx is not generated, dual image due to cross talk is not generated.

Figure 14B:
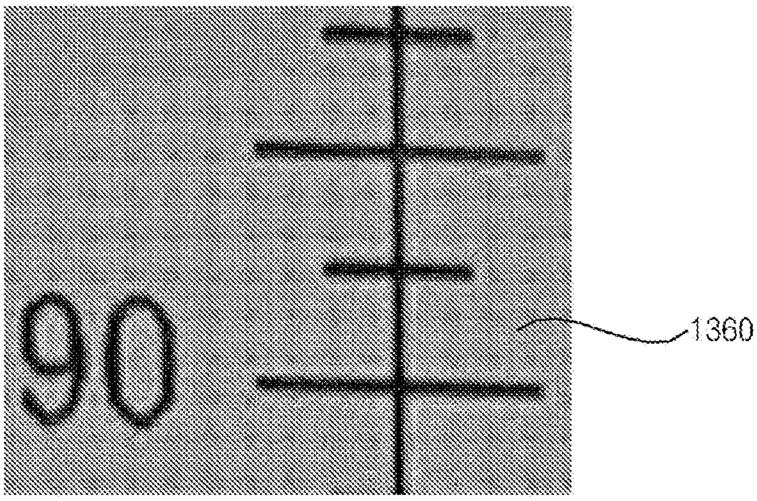

Therefore, during image display, a clear image 1360 can be displayed as shown in FIG. 14B.

Meanwhile, in FIG. 14A, a difference between a maximum light amount LV4 during the first TSv period which is the first frame period and the previous light amount Lv3 is ΔLa, and a difference between the maximum light amount Lb during the second TSv period which is the second frame period and the light amount LV4 is ΔLb, which is larger than ΔLa.

That is, the processor 1130 may control the gradual light change rate during the second frame period to be greater than the gradual light change rate during the first frame period, in consideration of the liquid crystal response speed change rate of the liquid crystal panel 210. Accordingly, it is possible to prevent dual image display.

Meanwhile, the processor 1130 may control the light change rate of the light source to be less than the liquid crystal response speed change rate of the liquid crystal panel 210. Accordingly, it is possible to prevent dual image display.

Meanwhile, the processor 1130 may change the second frequency, based on movement or an average luminance level of an image input to the panel 210. This will be described with reference to FIG. 15 below.

FIG. 15A shows the vertical synchronization signal Vsync, the switching control signal SG4*b* output from the processor 1130, and the current ICa flowing through the light source, when the average luminance level of the input image 1510 is a first luminance level.

When the average luminance level of the input image 1510 is a first luminance level, the processor 1130 may set 480 Hz, which is four times the first frequency of the vertical synchronization signal Vsync, as the second frequency, and output the second frequency-based switching control signal SG4*b*.

In the drawing, the switching control signal SG4*b* having a level that gradually increases in the order of 0 level, LV2 level, LV3 level, and LVm level is illustrated.

Accordingly, the current flowing through the light source gradually increases in the order of 0 level, LE2 level, LE3 level, and LEm level, and accordingly, the output light amount also increases gradually.

Figure 16:
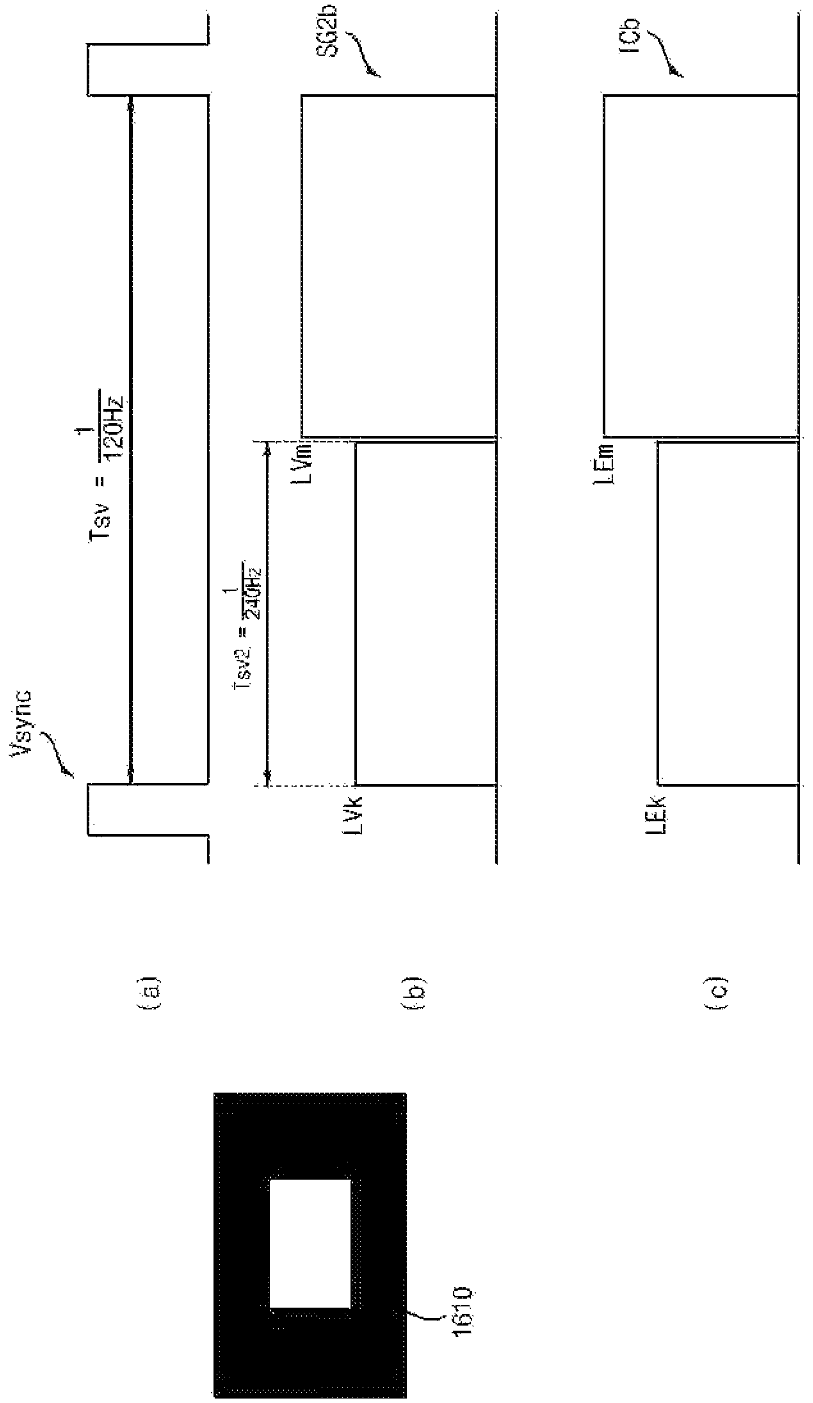

FIG. 16 illustrates the vertical synchronization signal Vsync, the switching control signal SG2*b* output from the processor 1130, and the current ICb flowing through the light source, when the average luminance level of the input image 1610 is a second luminance level lower than a first luminance level.

When the average luminance level of the input image 1610 is the second luminance level lower than the first luminance level, the processor 1130 may set 240 Hz, which is twice the first frequency of the vertical synchronization signal Vsync, as the second frequency, and may output a second frequency-based switching control signal SG2*b*.

Figure 15:
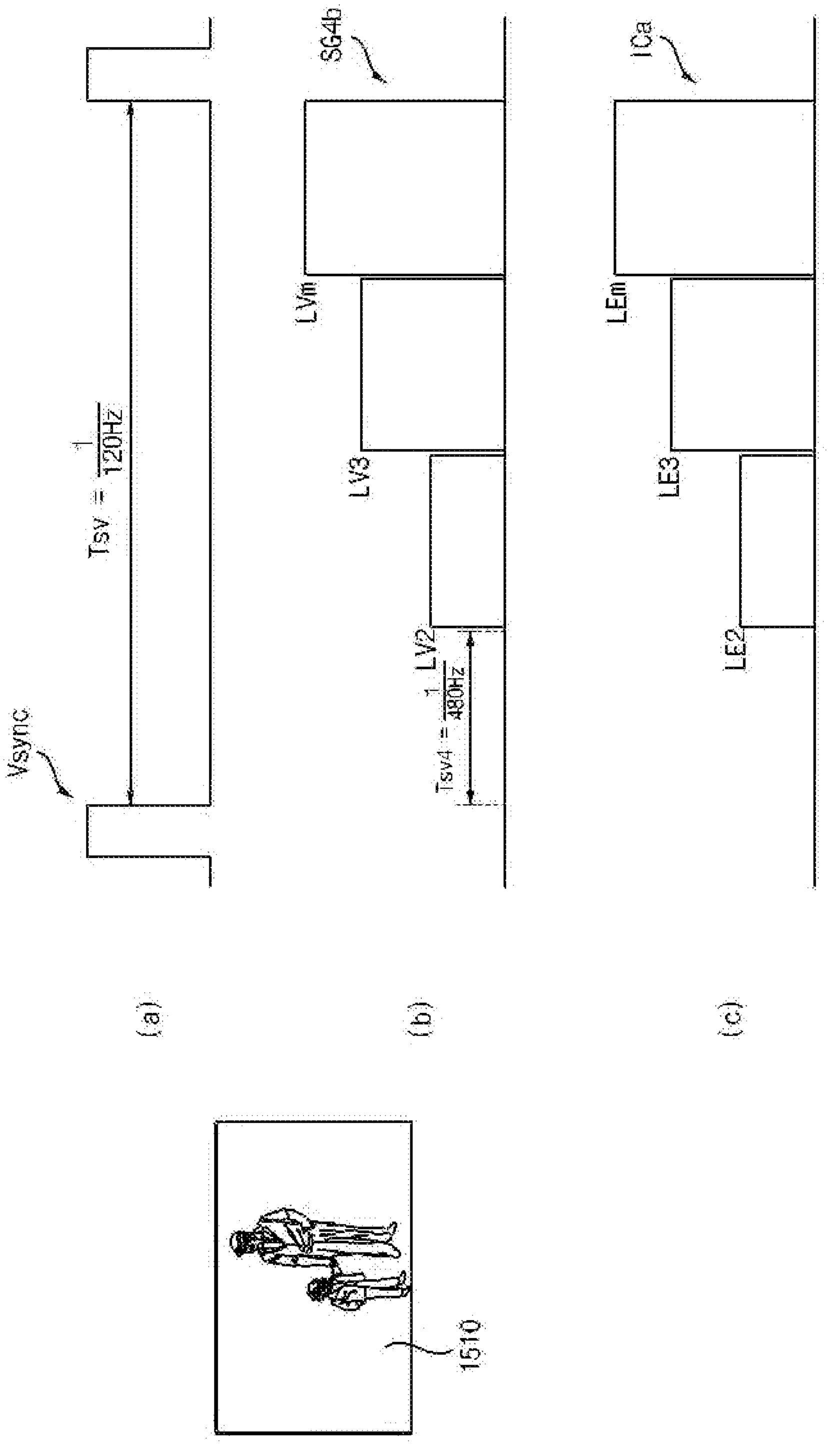

That is, compared to FIG. 15, as the average luminance level of the input image 1610 is lowered, the frequency of the second frequency may be lowered.

In the drawing, the switching control signal SG2*b* having a level that gradually increases up to the LVk level and the LVm level is illustrated.

Accordingly, the current flowing through the light source gradually increases up to the LEk level and the LEm level, and accordingly, the output light amount also gradually increases.

Figure 17:
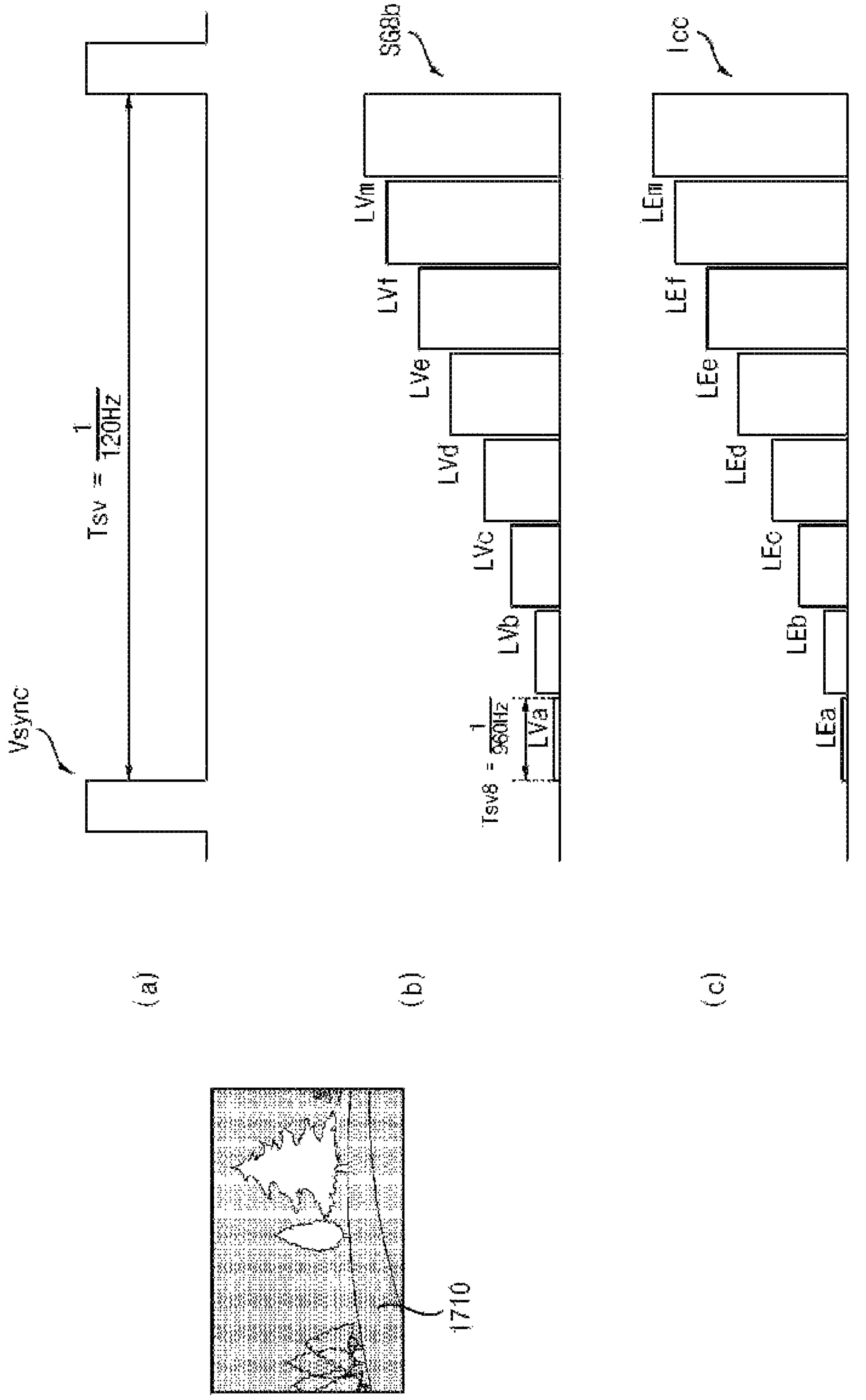

FIG. 17 shows the vertical synchronization signal Vsync, the switching control signal SG8*b* output from the processor 1130, and the current ICc flowing through the light source, when the average luminance level of the input image 1710 is a third luminance level higher than the first luminance level.

When the average luminance level of the input image 1710 is the third luminance level higher than the first luminance level, the processor 1130 may set 960 Hz, which is 8 times the first frequency of the vertical synchronization signal Vsync, as the second frequency, and output the second frequency-based switching control signal SG8*b*.

That is, in comparison with FIG. 15, as the average luminance level of the input image 1610 increases, the frequency of the second frequency may increase.

In the drawing, the switching control signal SG8*b* having a level gradually increasing in the order of LVa, LVb, LVc, LVd, LVe, LVf, and LVm levels is illustrated.

Accordingly, the current flowing through the light source is gradually increased in the order of LEa, LEb, LEc, LED, LEe, LEf, and LEm levels, and accordingly, the output light amount also gradually increases.

Figure 18:
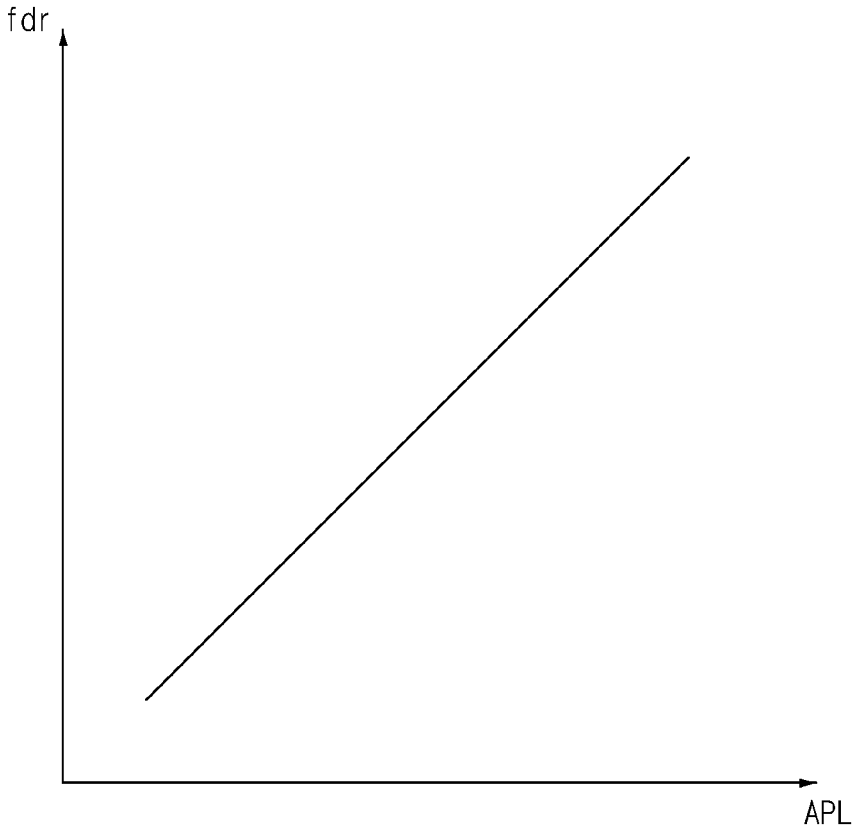

FIG. 18 is a diagram showing a relationship between an average luminance level and a driving frequency of a light source.

Referring to FIG. 18, as the average luminance level increases, the driving frequency of the light source may increase.

For example, when the average luminance level of a second image input to the panel 210 is greater than that of a first image, the processor 1130 may control the driving frequency of the light source LS1 to LS6 in case of displaying the second image to be higher than in case of displaying the first image. Accordingly, when the light source is driven based on the switching control signal (SG) having variable amplitude, the sharpness of the image may be improved.

Meanwhile, when the luminance of a second area is greater than the luminance of a first area among the images input to the panel 210, the processor 1130 may control the driving frequency of the light source LS1 to LS6 corresponding to the second area to be higher than the driving frequency of the light source LS1 to LS6 corresponding to the first area. Accordingly, when the light source is driven based on the switching control signal (SG) having variable amplitude, the sharpness of the image may be improved.

Similarly, when the movement of the second image is greater than that of the first image input to the panel 210, the processor 1130 may control the driving frequency of the light source LS1 to LS6 in case of displaying the second image to be higher than in case of displaying the first image. Accordingly, when the light source is driven based on the switching control signal (SG) having variable amplitude, the sharpness of the image may be improved.

Meanwhile, the operating method of the image display apparatus of the present disclosure can also be embodied as processor readable code on a processor-readable recording medium included in the image display apparatus. The processor-readable recording medium includes all kinds of recording apparatuses storing data that can be read by a processor, and includes those that are implemented in the form of carrier waves such as data transmission through the Internet. In addition, the processor-readable recording medium is dispersed in computer systems connected through a network, so that the processor-readable code can be stored and executed in a distributed fashion.

In addition, although the present disclosure has been described with reference to specific embodiments shown in the drawings, it is apparent to those skilled in the art that the present description is not limited to those exemplary embodiments and is embodied in many forms without departing from the scope of the present disclosure, which is described in the following claims. These modifications should not be individually understood from the technical spirit or scope of the present disclosure.

What is claimed is:

1. An image display apparatus comprising:

a display panel;

a plurality of light sources configured to output light to the display panel;

a plurality of switching elements configured to switch the plurality of light sources, respectively; and a processor configured to output a switching control signal having variable amplitude to a switching element of the plurality of switching elements, wherein the processor is further configured to control a driving frequency of a light source of the plurality of light sources corresponding to the switching element to be equal to a second frequency higher than a first frequency corresponding to a vertical synchronization signal of the display panel.

2. The image display apparatus of claim 1, wherein in response to a driving frequency variable mode of the light source, the processor is configured to drive the switching element based on the second frequency.

3. The image display apparatus of claim 1, wherein the processor is further configured to change a level of the switching control signal output to the switching element, for every period corresponding to the second frequency.

4. The image display apparatus of claim 1, wherein the processor is further configured to change a level of the switching control signal output to the switching element, for every second period corresponding to the second frequency during a first period corresponding to the first frequency.

5. The image display apparatus of claim 1, wherein during a first period corresponding to the first frequency, the processor is further configured to sequentially increase or gradually decrease a level of the switching control signal output to the switching element.

6. The image display apparatus of claim 1, wherein during a first period corresponding to the first frequency, the processor is further configured to change a level of a current flowing through the light source.

7. The image display apparatus of claim 1, wherein during a first period corresponding to the first frequency, the processor is further configured to sequentially increase or gradually decrease a level of a current flowing through the light source.

8. The image display apparatus of claim 1, wherein:

a first area of the display panel displays a white image during a first frame period;

the first area of the display panel displays a black image during a second frame period after the first frame period;

the processor controls a first light source of the plurality of light sources corresponding to the first area to output a gradually increasing light during the first frame period; and the processor controls the first light source corresponding to the first area to output a gradually decreasing light during the second frame period.

9. The image display apparatus of claim 8, wherein the display panel includes a liquid crystal panel, and wherein the processor controls the first light source corresponding to the first area to output a gradually increasing light or a gradually decreasing light, in response to a liquid crystal response speed pattern of the liquid crystal panel.

10. The image display apparatus of claim 8, wherein the display panel includes a liquid crystal panel, and the processor controls a light change rate of the first light source corresponding to the first area to be less than a liquid crystal response speed change rate of the liquid crystal panel.

11. The image display apparatus of claim 8, wherein the processor controls a gradual light change rate during the second frame period to be greater than a gradual light change rate during the first frame period.

12. The image display apparatus of claim 1, wherein the processor is further configured to change the second frequency, based on a movement or average luminance level of an image input to the display panel.

13. The image display apparatus of claim 1, wherein in response to a movement of a second image input to the display panel being greater than a movement of a first image input to the display panel, the processor is further configured to control the driving frequency of the light source to be higher when displaying the second image than when displaying the first image.

14. The image display apparatus of claim 1, wherein in response to an average luminance level of a second image input to the display panel being greater than an average luminance level of a first image input to the display panel, the processor is further configured to control the driving frequency of the light source to be higher when displaying the second image than when displaying the first image.

15. The image display apparatus of claim 1, wherein in response to a luminance of a second area being greater than a luminance of a first area among images input to the display panel, the processor is further configured to control a driving frequency of the light source corresponding to the second area to be higher than a driving frequency of the light source corresponding to the first area.

16. An image display apparatus comprising:

a display panel;

a plurality of light sources configured to output light to the display panel;

a plurality of switching elements configured to switch the plurality of light sources, respectively; and a processor configured to output a switching control signal having variable amplitude to a switching element of the plurality of switching elements, wherein in response to the display panel displaying a certain image during a frame period corresponding to a vertical synchronization signal of the display panel, the processor is further configured to gradually increase or decrease a light output from a light source of the plurality of light sources corresponding to the switching element.

17. The image display apparatus of claim 16, wherein:

a first area of the display panel displays a white image during a first frame period;

the first area of the display panel displays a black image during a second frame period after the first frame period;

the processor controls a first light source of the plurality of light sources corresponding to the first area to output a gradually increasing light during the first frame period; and the processor controls the first light source corresponding to the first area to output a gradually decreasing light during the second frame period.

18. The image display apparatus of claim 17, wherein the display panel includes a liquid crystal panel, and wherein the processor controls the first light source corresponding to the first area to output a gradually increasing light or a gradually decreasing light, in response to a liquid crystal response speed pattern of the liquid crystal panel.

19. The image display apparatus of claim 17, wherein the panel includes a liquid crystal panel, and wherein the processor controls a light change rate of the first light source corresponding to the first area to be less than a liquid crystal response speed change rate of the liquid crystal panel.

* * * * *